US009170407B2

(12) United States Patent
Shinohara

(10) Patent No.: US 9,170,407 B2
(45) Date of Patent: Oct. 27, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Kenji Shinohara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/447,413

(22) Filed: Jul. 30, 2014

(65) Prior Publication Data

US 2015/0036226 A1 Feb. 5, 2015

(30) Foreign Application Priority Data

Aug. 2, 2013 (JP) ................................ 2013-161330

(51) Int. Cl.
*G02B 15/14* (2006.01)

(52) U.S. Cl.
CPC ..................................... *G02B 15/14* (2013.01)

(58) Field of Classification Search
CPC .. G02B 15/173; G02B 15/14; G02B 13/0045; G02B 9/60
USPC .......................................................... 359/687
See application file for complete search history.

(56) References Cited

U.S. PATENT DOCUMENTS

2009/0174950 A1 * 7/2009 Hankawa et al. ............. 359/687

FOREIGN PATENT DOCUMENTS

JP 2007-264390 A 10/2007
JP 2009-163102 A 7/2009

* cited by examiner

*Primary Examiner* — Alicia M Harrington
(74) *Attorney, Agent, or Firm* — Canon USA Inc., IP Division

(57) ABSTRACT

A zoom lens includes, in order from an object side to an image side thereof, a first lens unit having a positive refractive power, a second lens unit having a negative refractive power, a third lens unit having a positive refractive power, and a fourth lens unit having a positive refractive power. A distance between adjacent ones of the lens units changes during zooming. The first lens unit consists of, in order from the object side to the image side thereof, one negative lens element and one positive lens element. Lengths of travel M1 and M2 of the first lens unit and the second lens unit, respectively, during zooming from a wide-angle end to a telephoto end, focal lengths f1 and f2 of the first lens unit and the second lens unit, respectively, and a zoom ratio Z of the zoom lens are set appropriately.

9 Claims, 21 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. The embodiments described herein are considered suitable for, for example, image pickup apparatuses including image pickup devices, such as a digital still camera, a video camera, a monitoring camera, and a broadcast camera, or image pickup apparatuses such as a silver-halide-film camera.

2. Description of the Related Art

Recent image pickup apparatuses including solid-state image pickup devices, such as a digital still camera and a video camera, have improved functions while the total sizes thereof are reduced. Zoom lenses intended for such apparatuses are desired to have short total lengths and high magnifications. To meet such demands, a known positive-lead, four-unit zoom lens includes lens units having positive, negative, positive, and positive refractive powers, respectively, in that order from an object side to an image side thereof.

Japanese Patent Application Laid-Open No. 2007-264390 discloses a zoom lens including low-cost lens elements and in which all lens units are moved during zooming while the distance between adjacent ones of the lens units is set appropriately. In the zoom lens according to Japanese Patent Application Laid-Open No. 2007-264390, a first lens unit consists of a positive lens element and a negative lens element, a third lens unit includes a plastic lens element, and the refractive power of the third lens element is set appropriately, whereby the thicknesses of the lens units are reduced. Thus, a high-magnification, low-cost zoom lens is provided.

Japanese Patent Application Laid-Open No. 2009-163102 discloses a zoom lens in which all lens units are moved during zooming while the distance between adjacent ones of the lens units is set appropriately. By appropriately setting the distance between adjacent ones of the lens units, aberrations that tend to occur around the image field during zooming are reduced. Thus, a high-magnification, compact zoom lens is provided.

In general, to provide a high-magnification imaging optical system, the refractive powers of the respective lens units included in the imaging optical system are increased while the distance between adjacent ones of the lens units are set appropriately. However, if the lengths of travel of the lens units during zooming are increased, the total length of the zoom lens may increase. As stated above, an increased total length of the zoom lens is not desirable.

SUMMARY OF THE INVENTION

According to an aspect of the present invention, there is provided a zoom lens including, in order from an object side to an image side thereof, a first lens unit having a positive refractive power, a second lens unit having a negative refractive power, a third lens unit having a positive refractive power, and a fourth lens unit having a positive refractive power. A distance between adjacent ones of the lens units changes during zooming. The first lens unit consists of, in order from the object side to the image side thereof, one negative lens element and one positive lens element. The zoom lens satisfies the following conditional expressions:

$$4.85<(M1/f1)\times Z<8.0$$

$$0.15<M2/f2<0.50$$

where M1 denotes a moving amount of the first lens unit during zooming from a wide-angle end to a telephoto end, M2 denotes a moving amount of the second lens unit during zooming from the wide-angle end to the telephoto end, f1 denotes a focal length of the first lens unit, f2 denotes a focal length of the second lens unit, and Z denotes a zoom ratio of the zoom lens.

Further features of the present invention will become apparent from the following description of exemplary embodiments with reference to the attached drawings.

DESCRIPTION OF THE EMBODIMENTS

Zoom lenses according to different embodiments of the present invention, and an image pickup apparatus including any one of the zoom lenses, will now be described in detail with reference to the attached drawings. The zoom lenses according to the embodiments of the present invention each include, in order from an object side to an image side thereof, a first lens unit L1 having a positive refractive power, a second lens unit L2 having a negative refractive power, a third lens unit L3 having a positive refractive power, and a fourth lens unit L4 having a positive refractive power.

Figure 1:
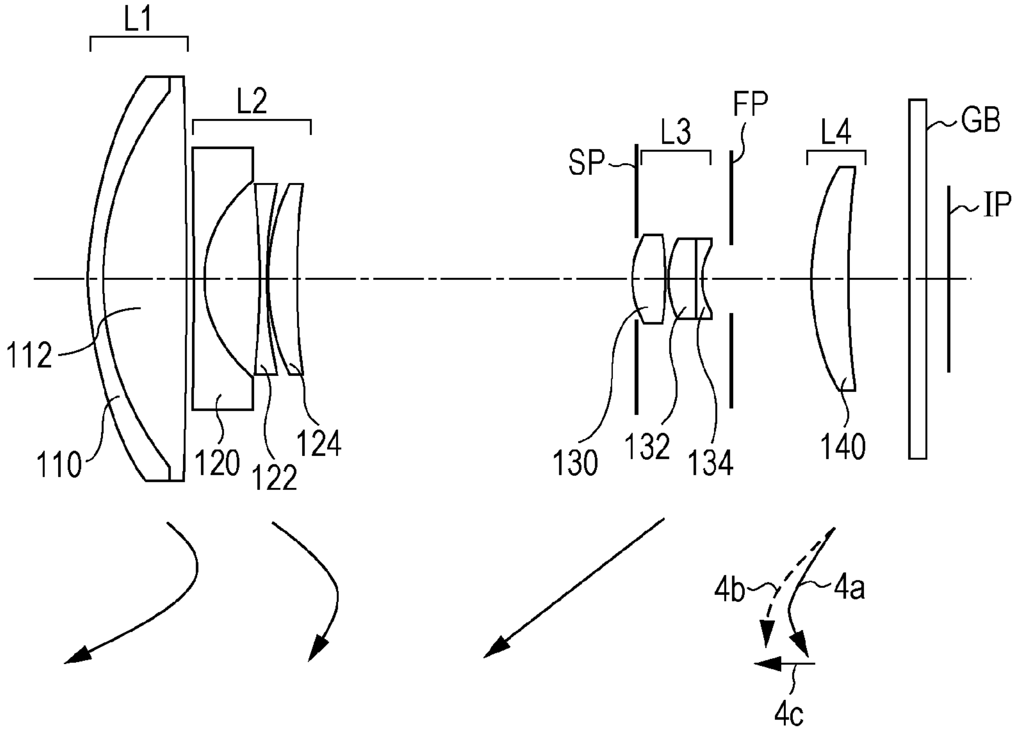
FIG. 1 is a sectional view of a zoom lens at a wide-angle end, according to a first embodiment.
Figure 2A:
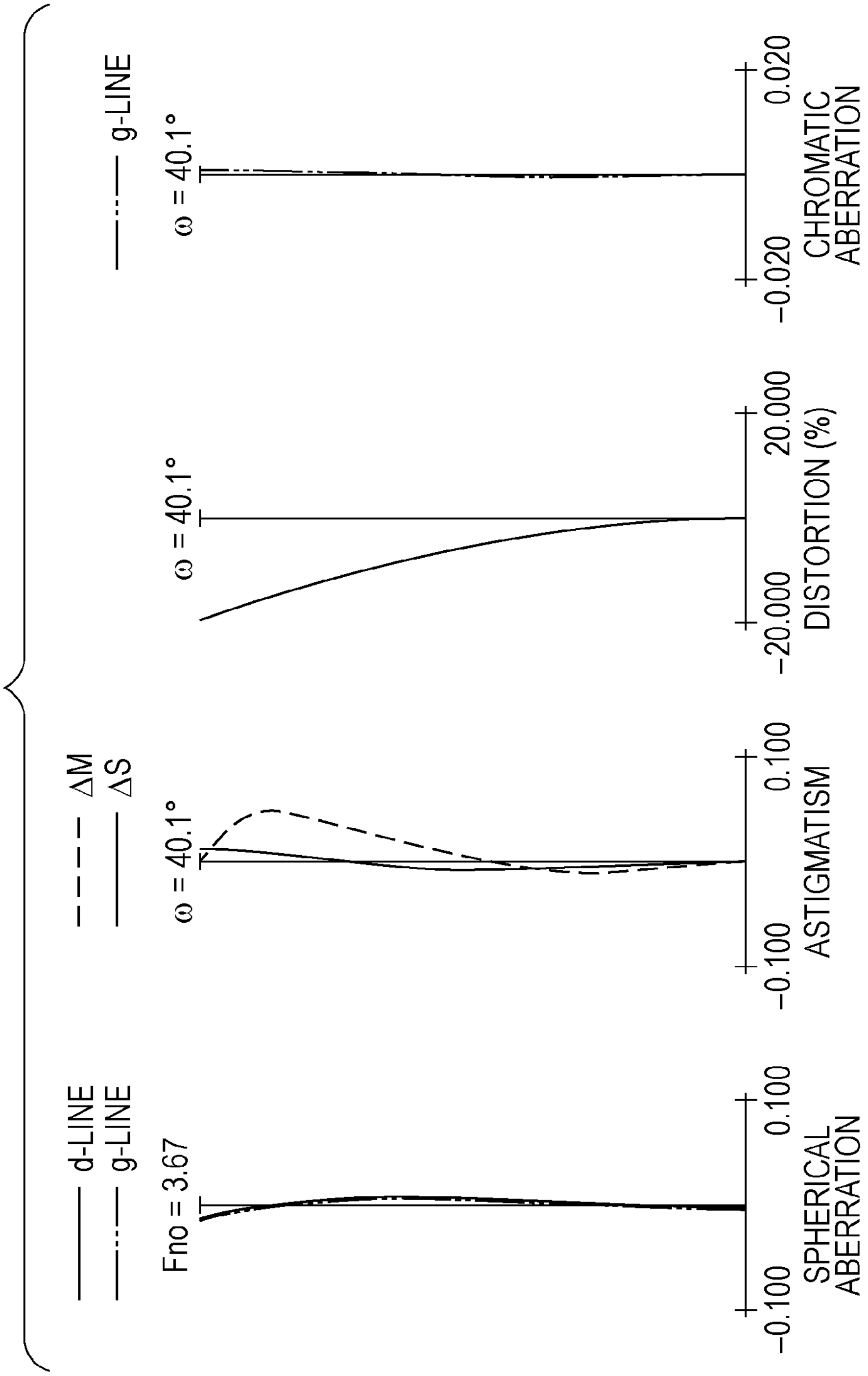
FIGS. 2A, 2B, and 2C are aberration charts of the zoom lens at the wide-angle end, at an intermediate zooming position, and at a telephoto end, respectively, according to the first embodiment.
Figure 2B:
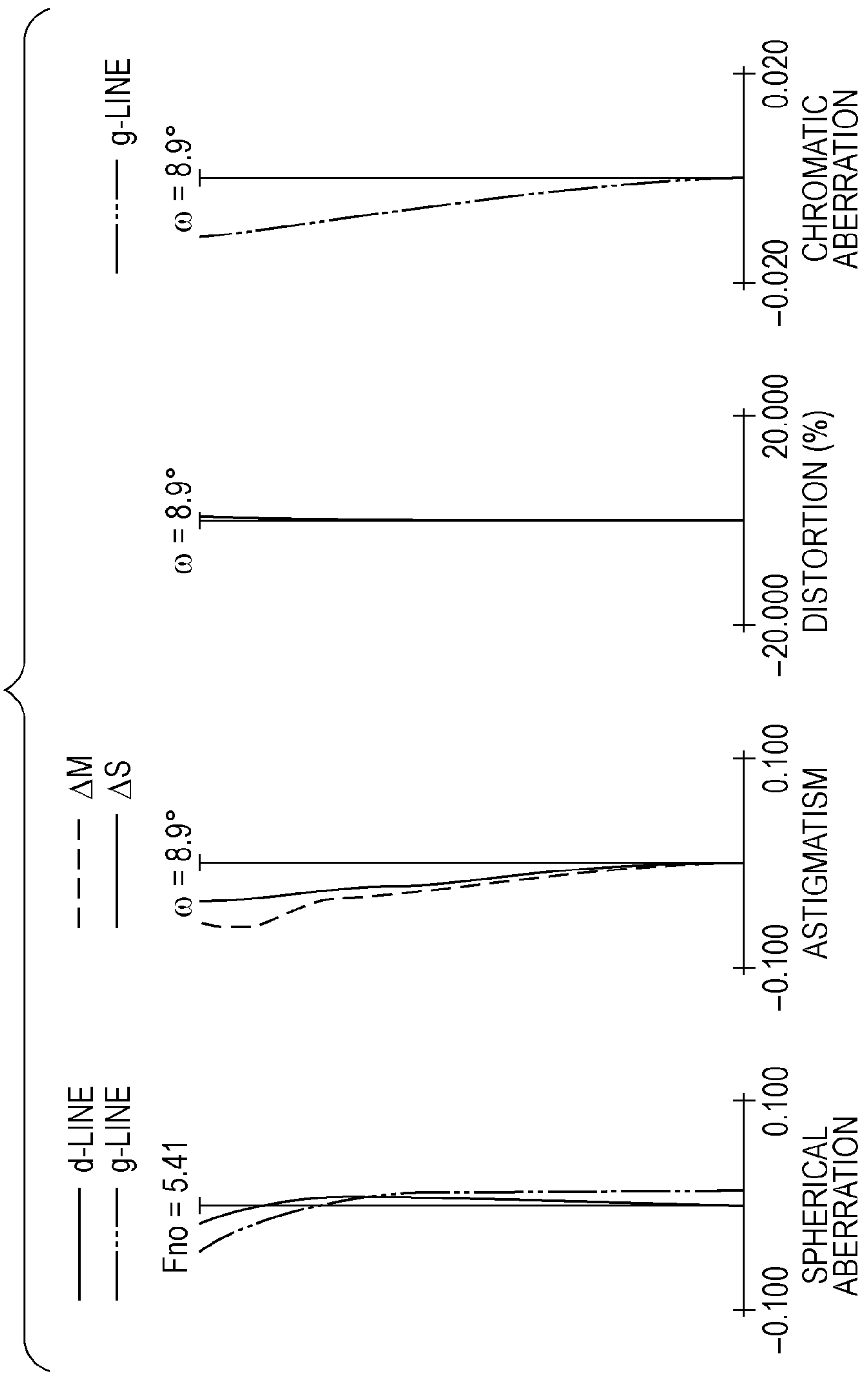
Figure 2C:
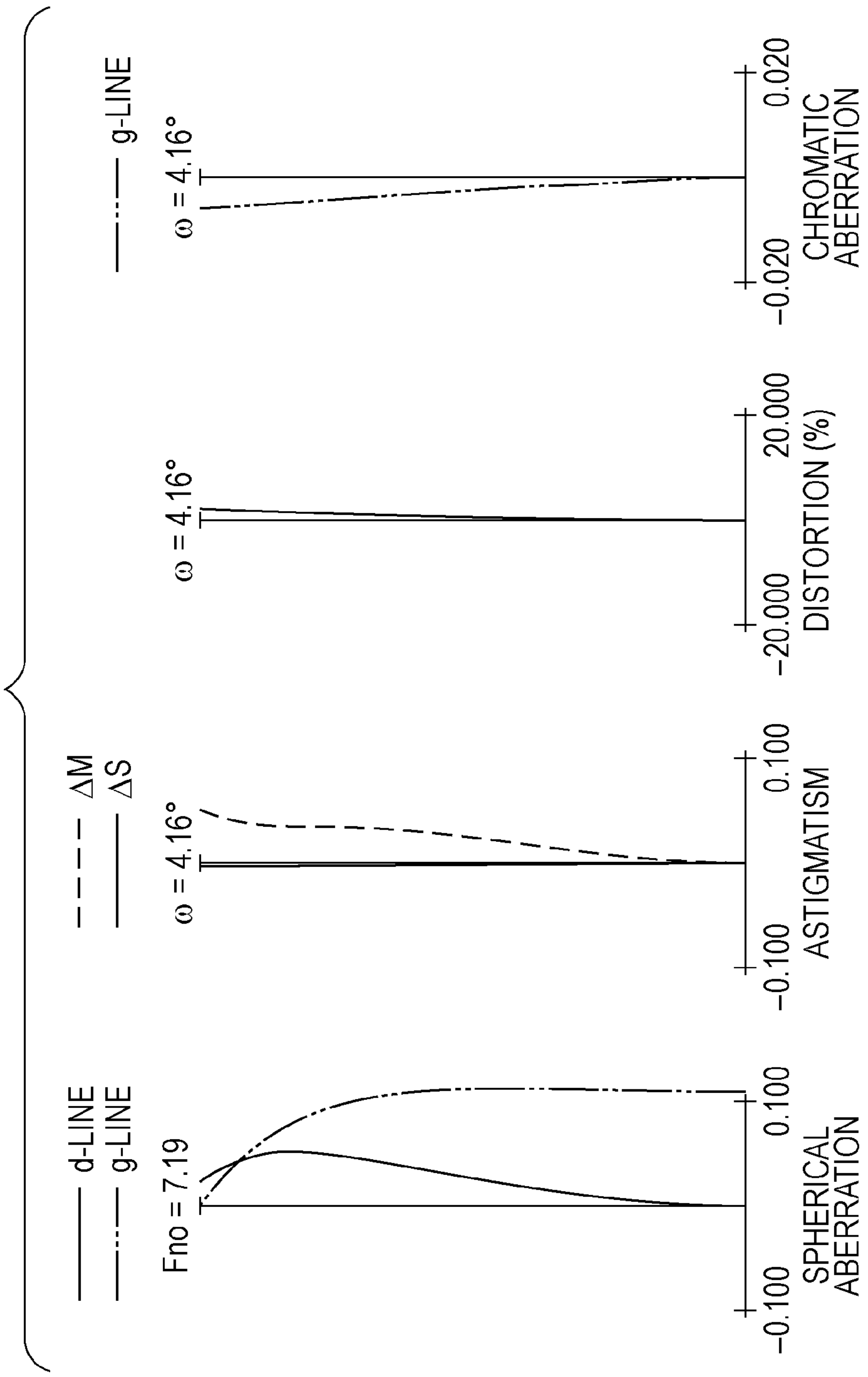
Figure 3:
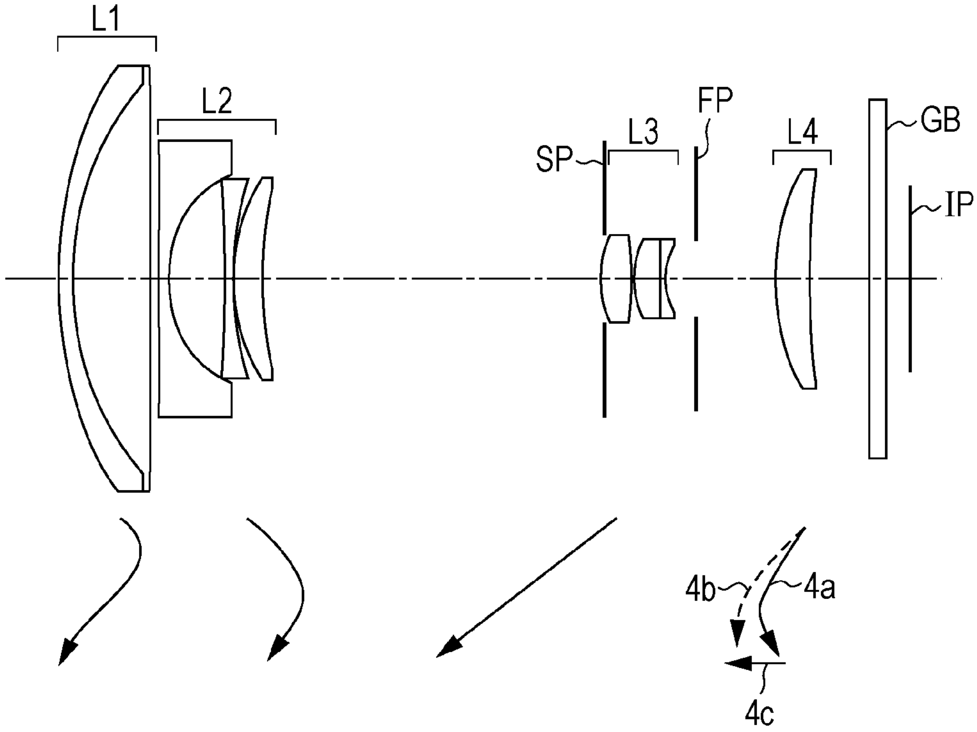
FIG. 3 is a sectional view of a zoom lens at a wide-angle end, according to a second embodiment.
Figure 4A:
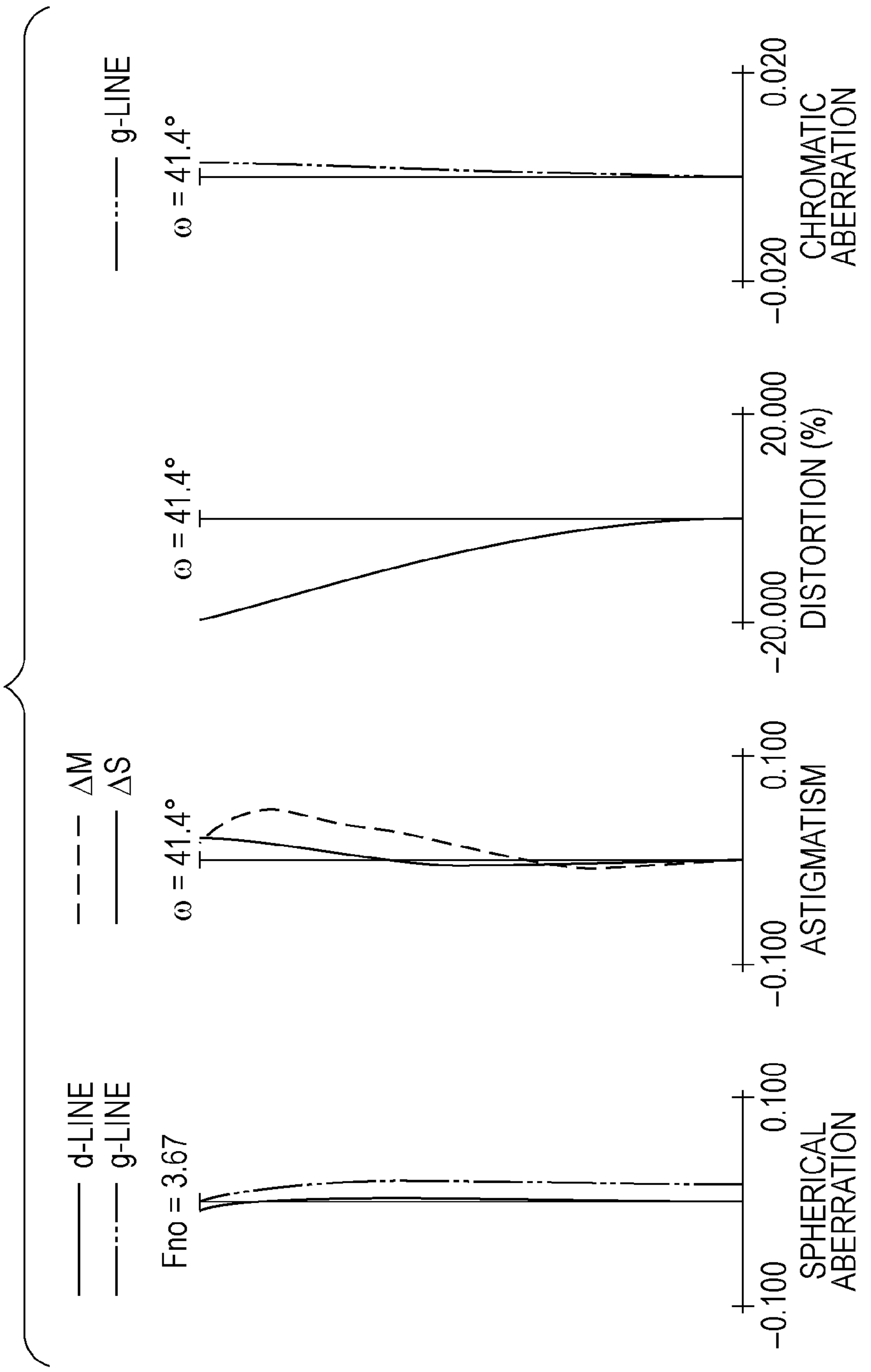
FIGS. 4A, 4B, and 4C are aberration charts of the zoom lens at the wide-angle end, at an intermediate zooming position, and at a telephoto end, respectively, according to the second embodiment.
Figure 4B:
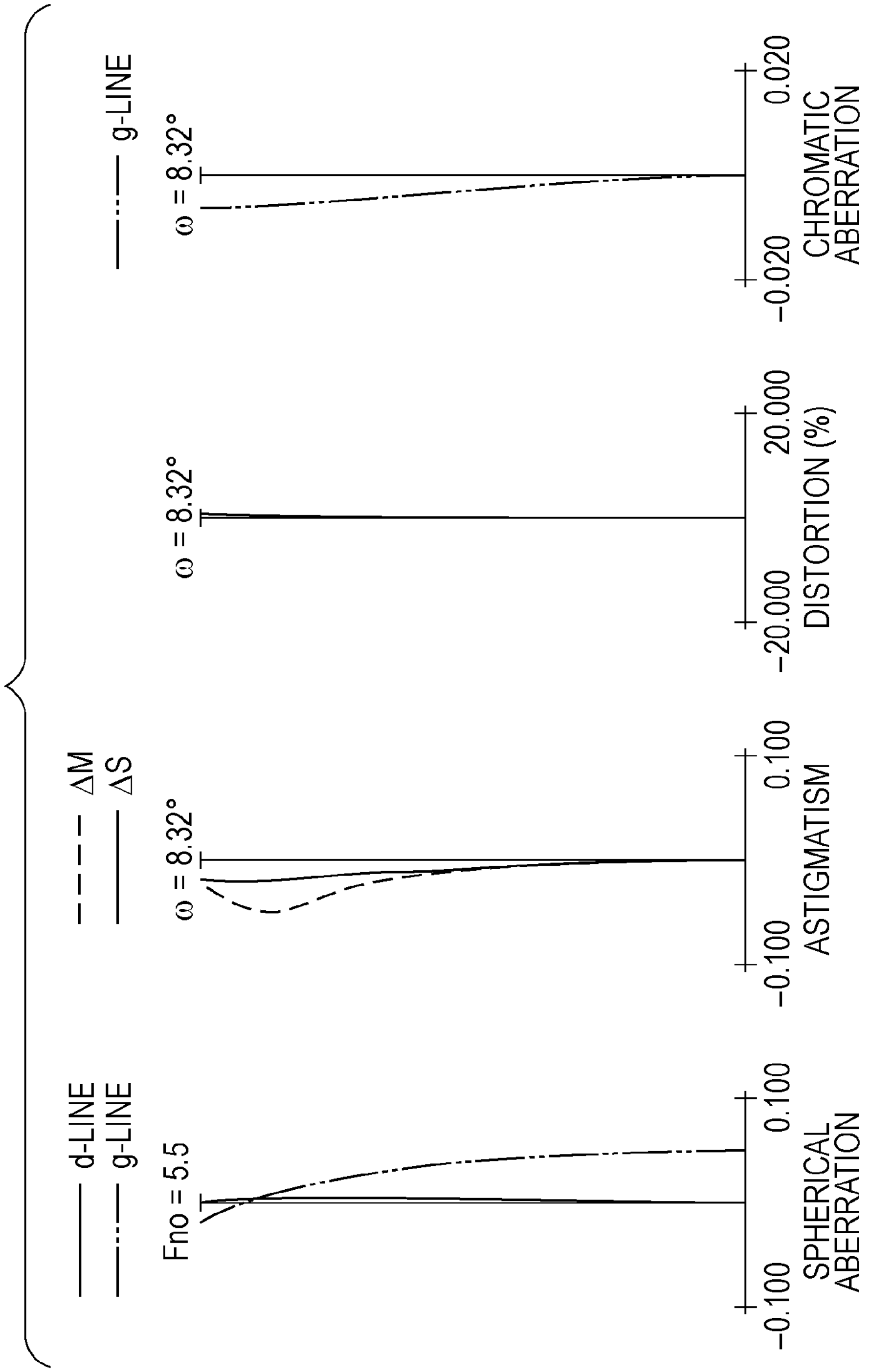
Figure 4C:
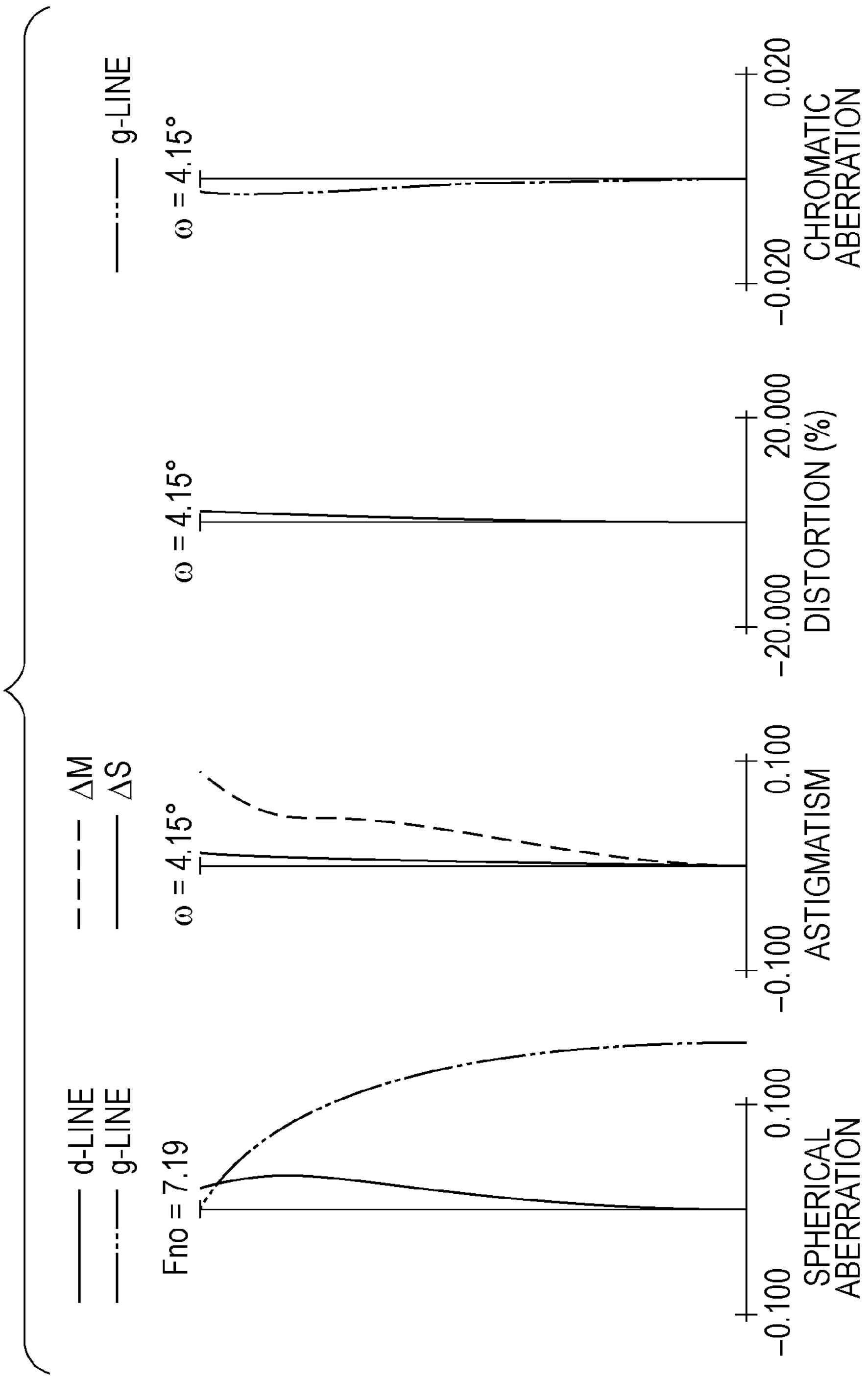

FIG. 1 is a sectional view of a zoom lens according to a first embodiment. The zoom lens of FIG. 1 is at a wide-angle end of the zooming range. FIGS. 2A, 2B, and 2C are aberration charts of the zoom lens, according to the first embodiment, at the wide-angle end, at an intermediate zooming position, and at a telephoto end, respectively. The zoom lens according to the first embodiment has a zoom ratio of 11.40 and an aperture ratio of about 3.67 to 7.19. FIG. 3 is a sectional view of a zoom lens according to a second embodiment. The zoom lens of FIG. 2 is at a wide-angle end of its zooming range. FIGS. 4A, 4B, and 4C are aberration charts of the zoom lens, according to the second embodiment, at the wide-angle end, at an intermediate zooming position, and at a telephoto end, respectively. The zoom lens according to the second embodiment has a zoom ratio of 11.94 and an aperture ratio of about 3.67 to 7.19.

Figure 5:
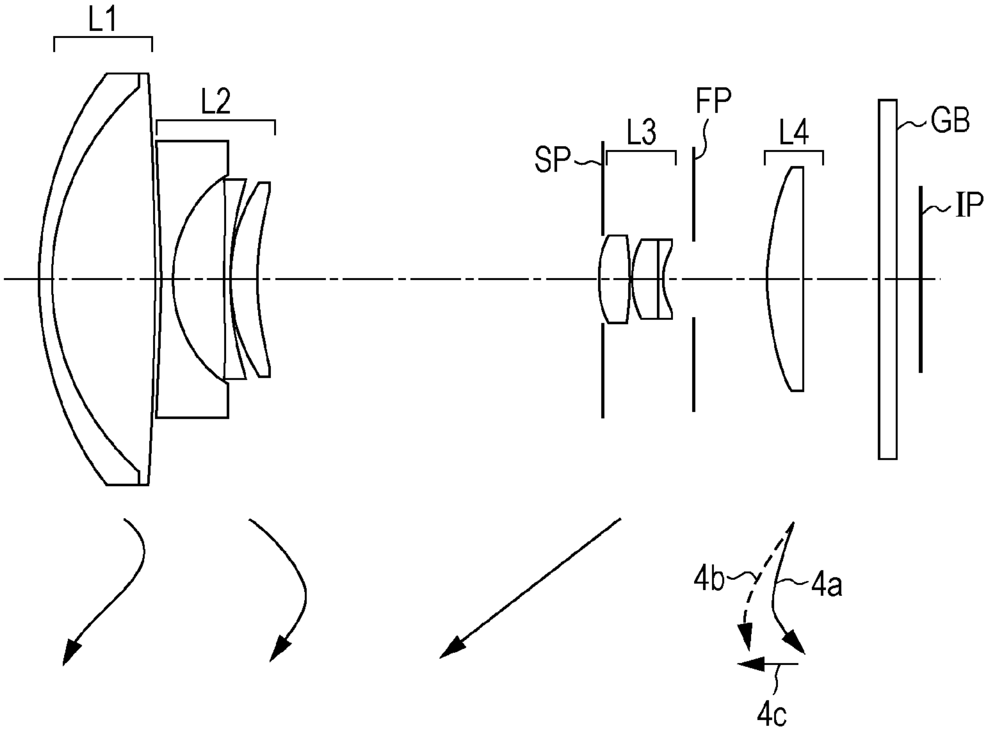
FIG. 5 is a sectional view of a zoom lens at a wide-angle end, according to a third embodiment.
Figure 6A:
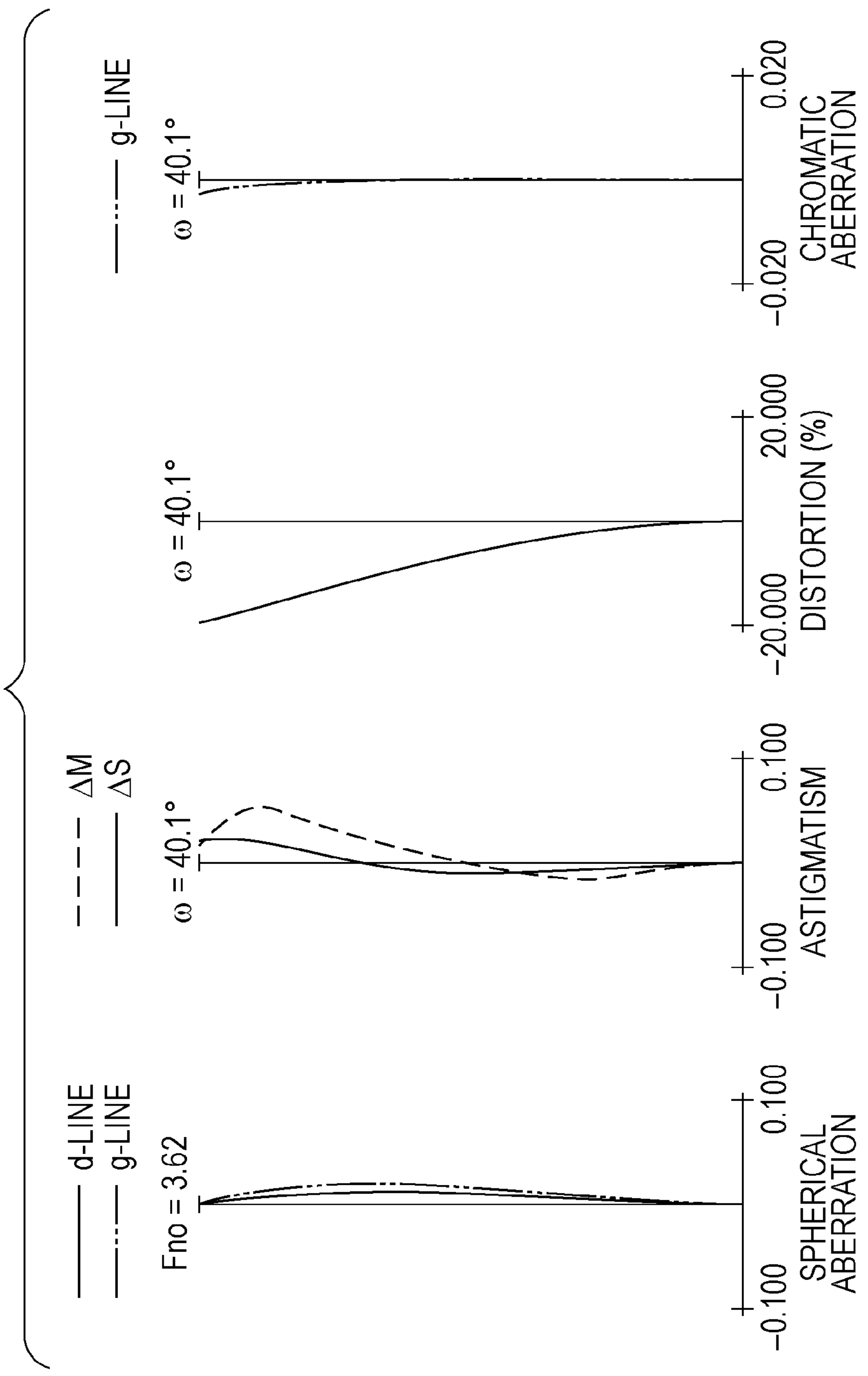
FIGS. 6A, 6B, and 6C are aberration charts of the zoom lens at the wide-angle end, at an intermediate zooming position, and at a telephoto end, respectively, according to the third embodiment.
Figure 6B:
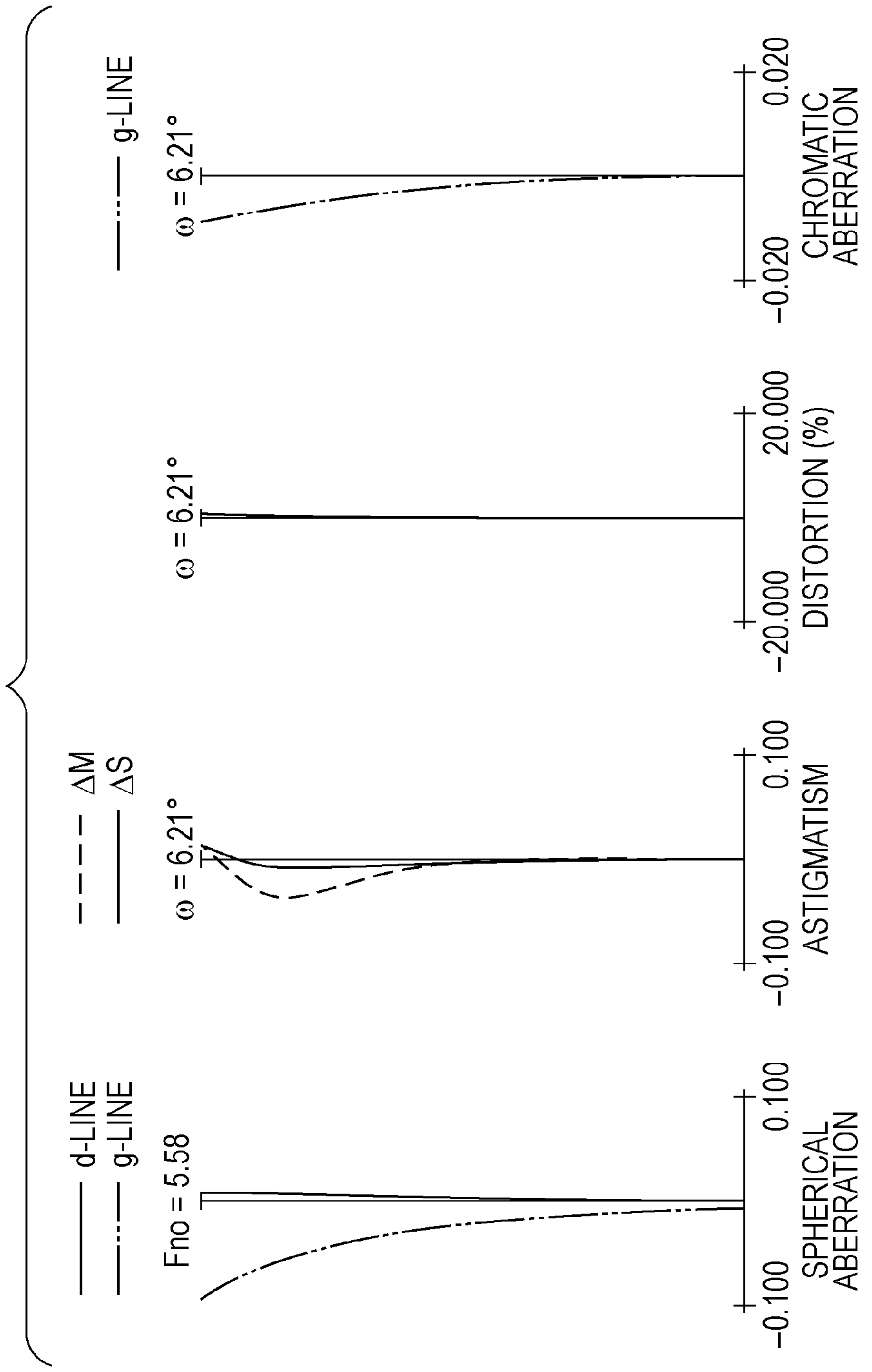
Figure 6C:
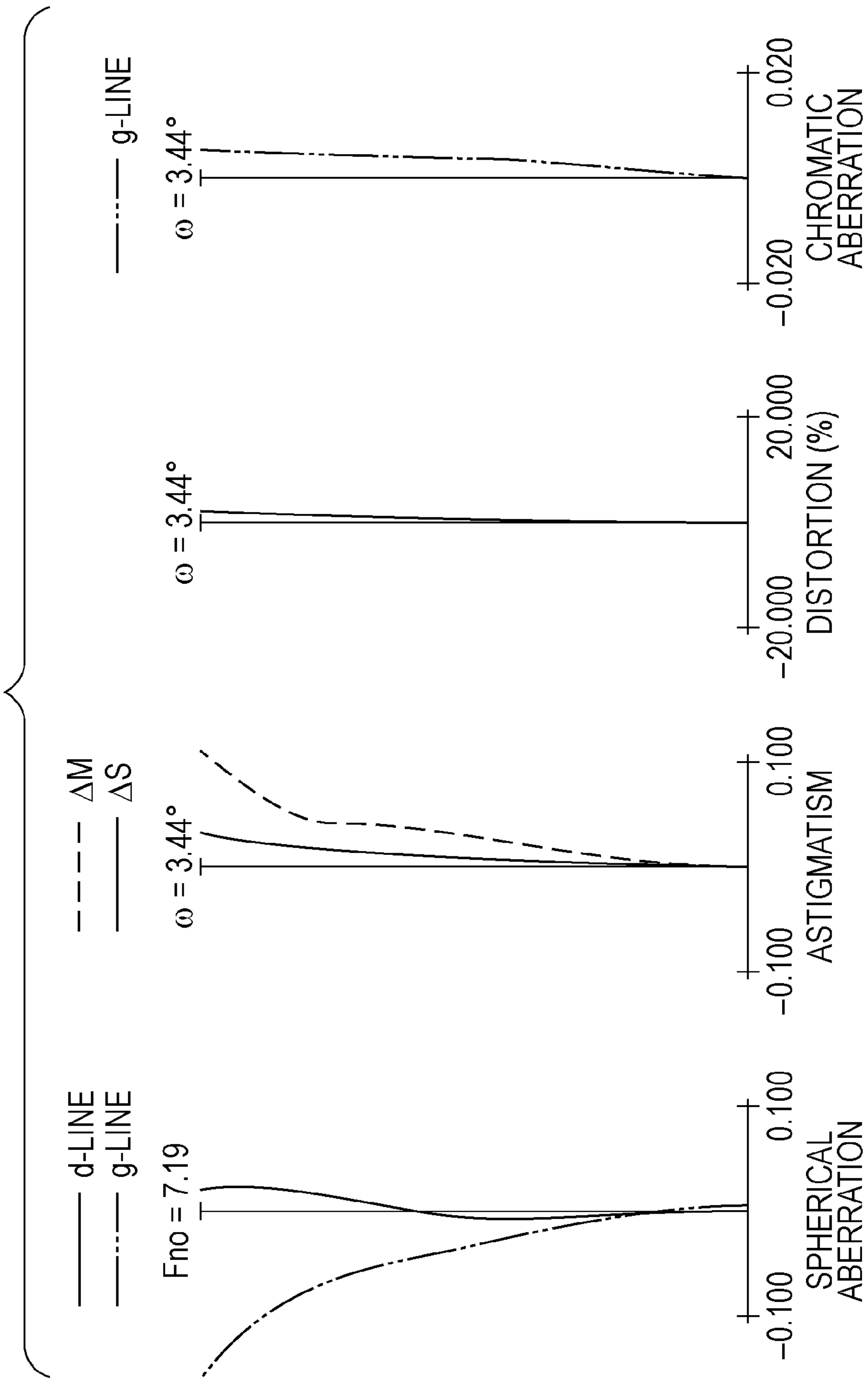
Figure 7:
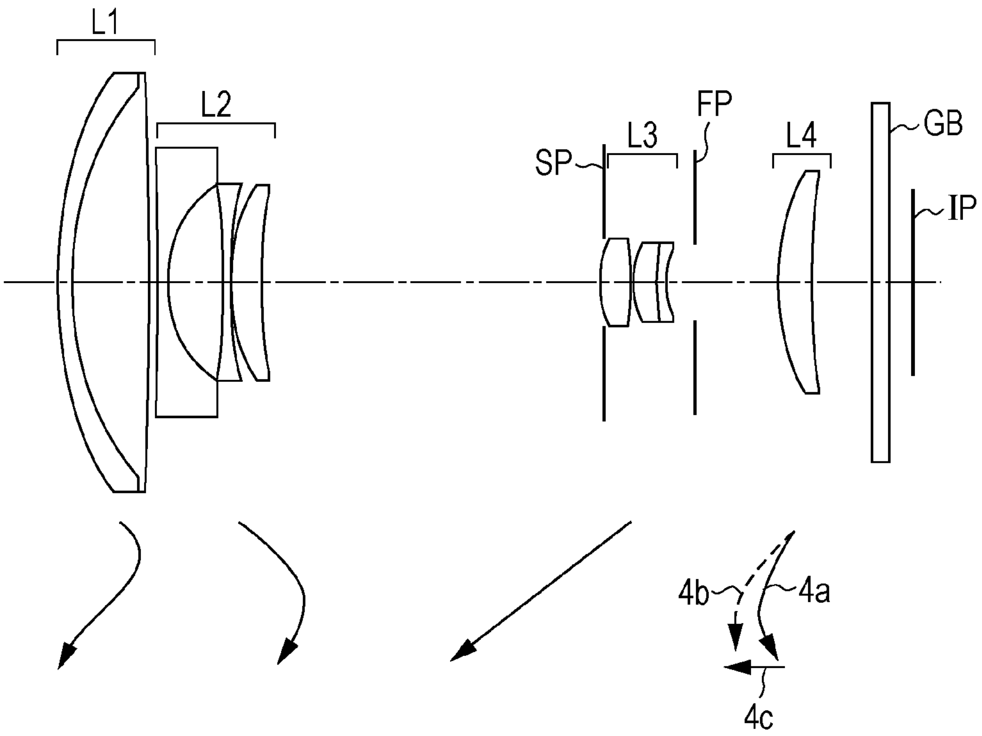
FIG. 7 is a sectional view of a zoom lens at a wide-angle end, according to a fourth embodiment.
Figure 8A:
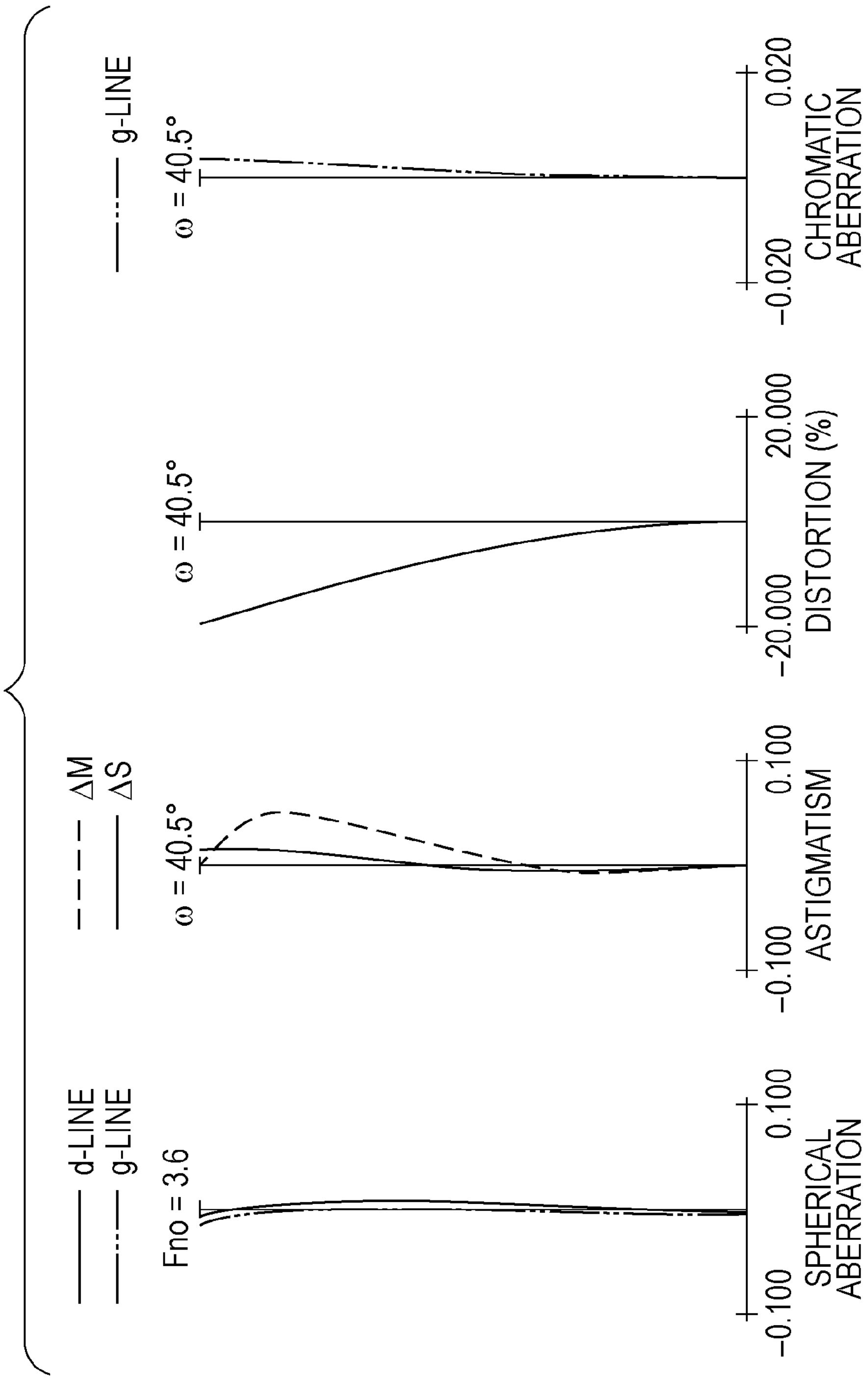
FIGS. 8A, 8B, and 8C are aberration charts of the zoom lens at the wide-angle end, at an intermediate zooming position, and at a telephoto end, respectively, according to the fourth embodiment.
Figure 8B:
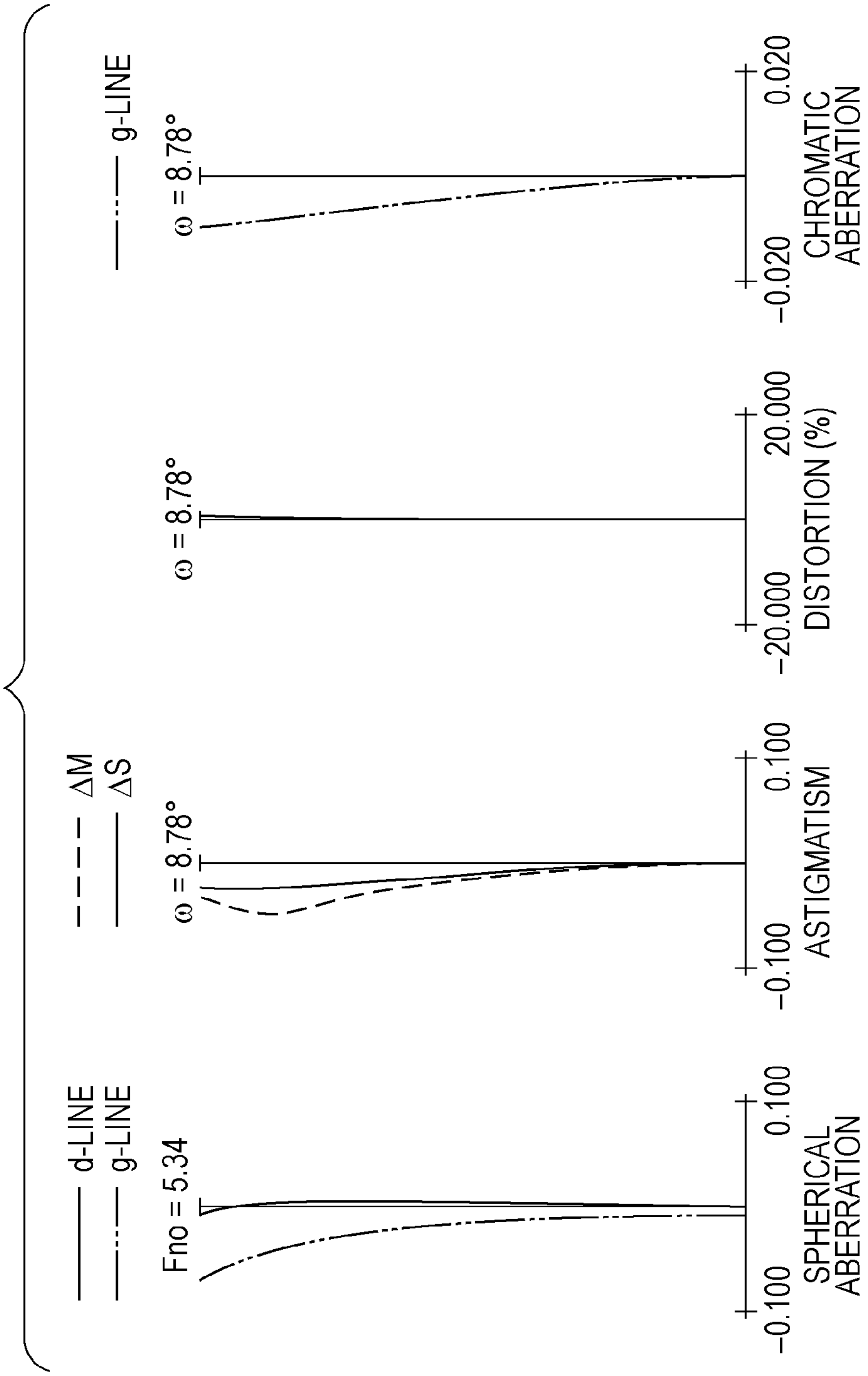
Figure 8C:
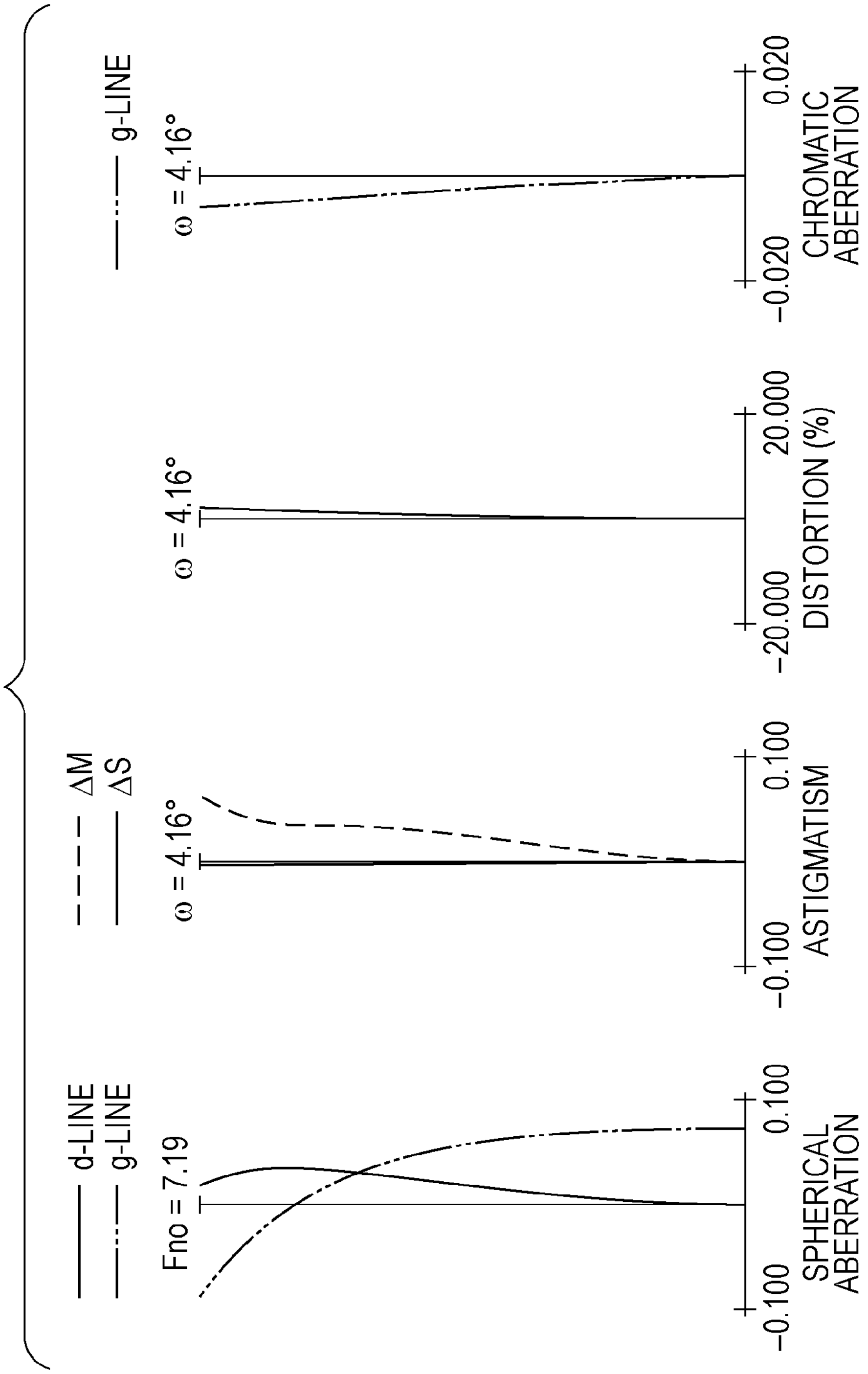

FIG. 5 is a sectional view of a zoom lens according to a third embodiment. The zoom lens illustrated in FIG. 5 is shown at a wide-angle end position of zooming. FIGS. 6A, 6B, and 6C are aberration charts of the zoom lens, according to the third embodiment, at the wide-angle end, at an intermediate zooming position, and at a telephoto end, respectively. The zoom lens according to the third embodiment has a zoom ratio of 13.87 and an aperture ratio of about 3.62 to 7.19. FIG. 7 is a sectional view of a zoom lens according to a fourth embodiment. The zoom lens of FIG. 4 is at a wide-angle end. FIGS. 8A, 8B, and 8C are aberration charts of the zoom lens, according to the fourth embodiment, at the wide-angle end, at an intermediate zooming position, and at a telephoto end, respectively. The zoom lens according to the fourth embodiment has a zoom ratio of 11.56 and an aperture ratio of about 3.60 to 7.19.

Figure 9:
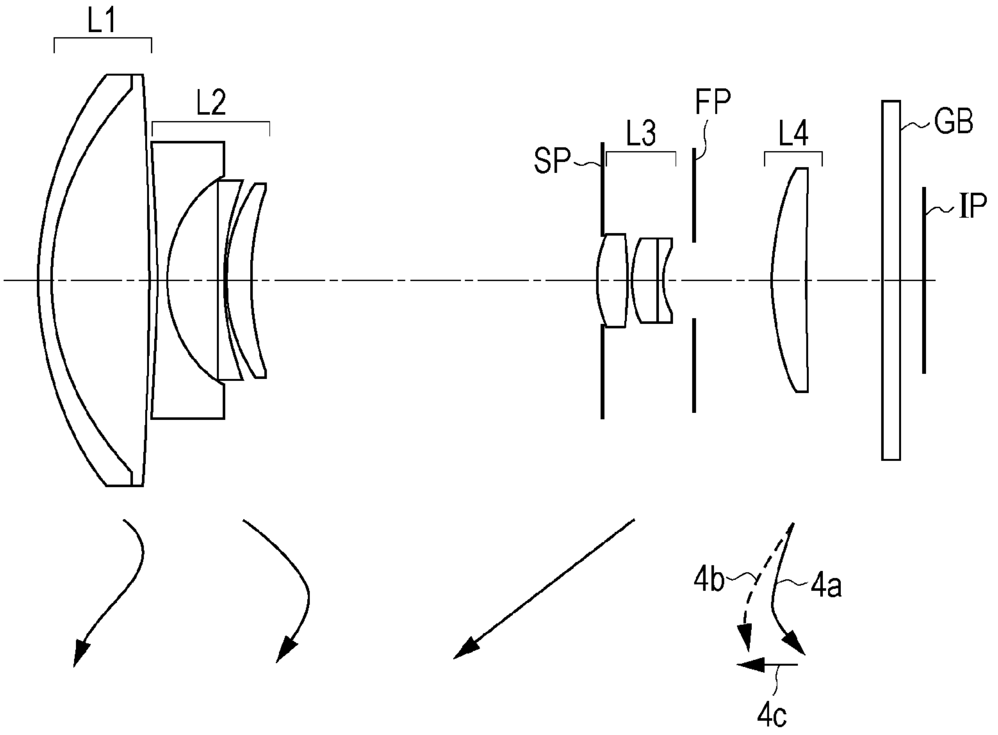
FIG. 9 is a sectional view of a zoom lens at a wide-angle end, according to a fifth embodiment.
Figure 10A:
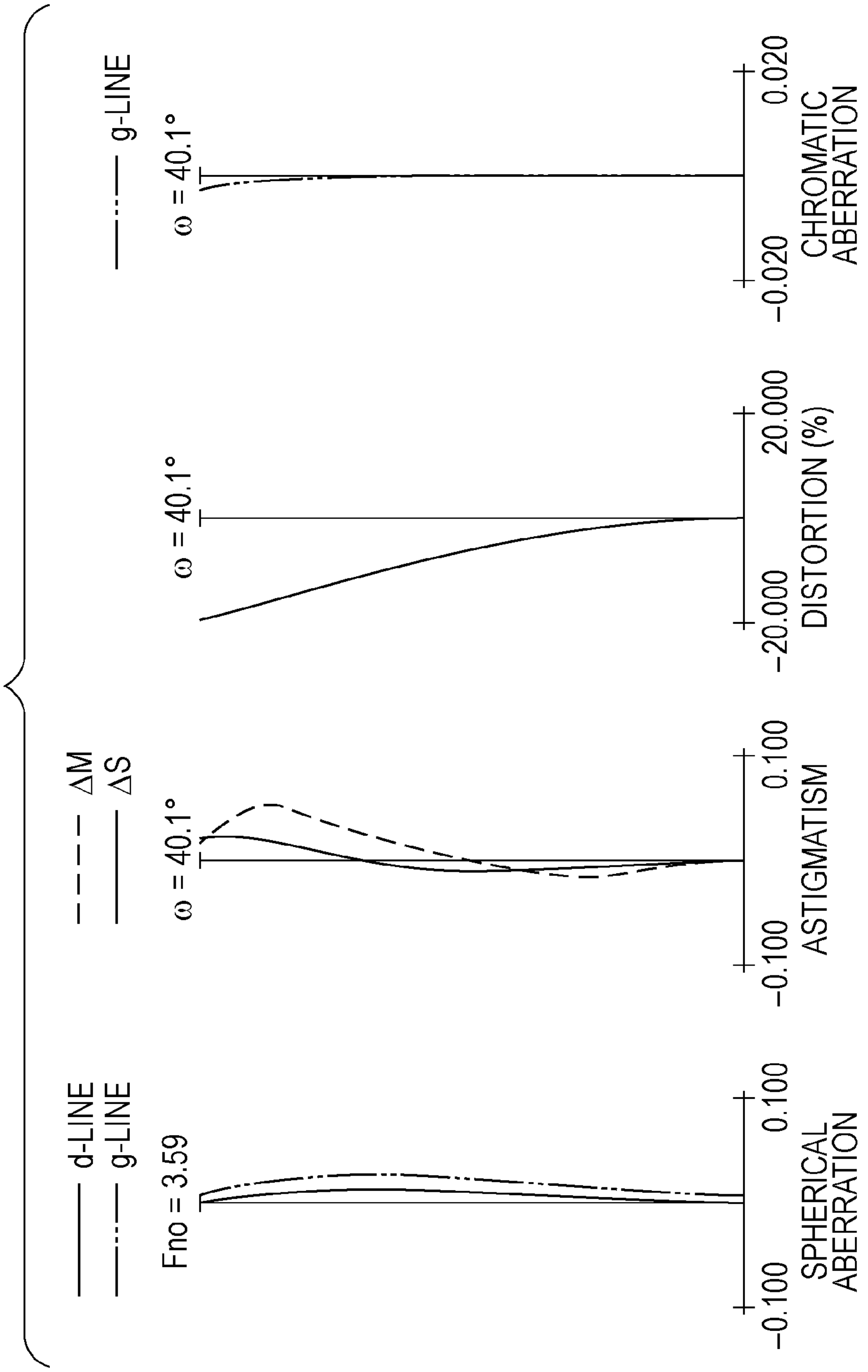
FIGS. 10A, 10B, and 10C are aberration charts of the zoom lens at the wide-angle end, at an intermediate zooming position, and at a telephoto end, respectively, according to the fifth embodiment.
Figure 10B:
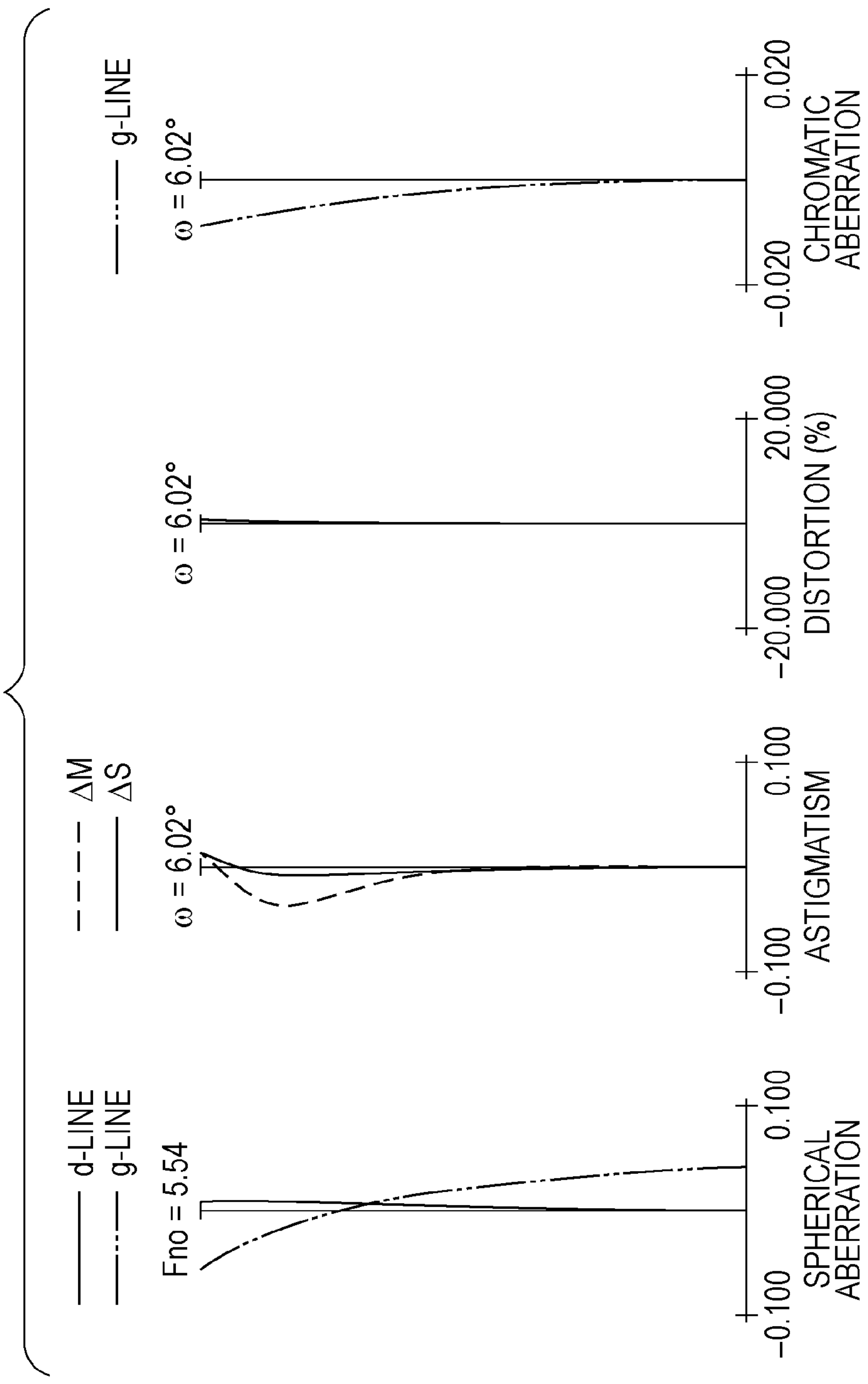
Figure 10C:
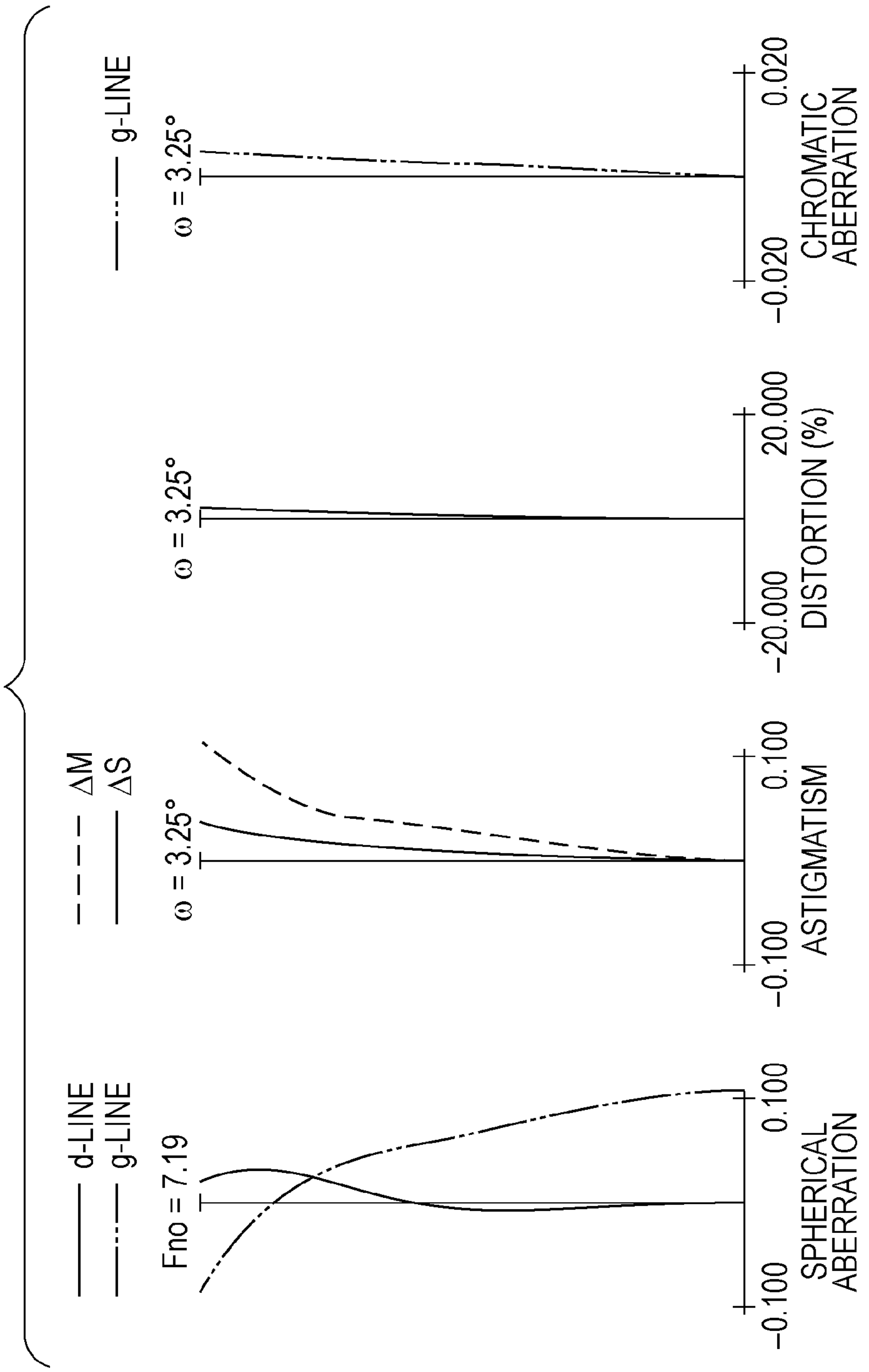

FIG. 9 is a sectional view of a zoom lens according to a fifth embodiment. The zoom lens of FIG. 9 is also shown at a wide-angle end position of zooming. FIGS. 10A, 10B, and 10C are aberration charts of the zoom lens, according to the fifth embodiment, at the wide-angle end, at an intermediate zooming position, and at a telephoto end, respectively. The zoom lens according to the fifth embodiment has a zoom ratio of 14.73 and an aperture ratio of about 3.59 to 7.19.

Figure 11:
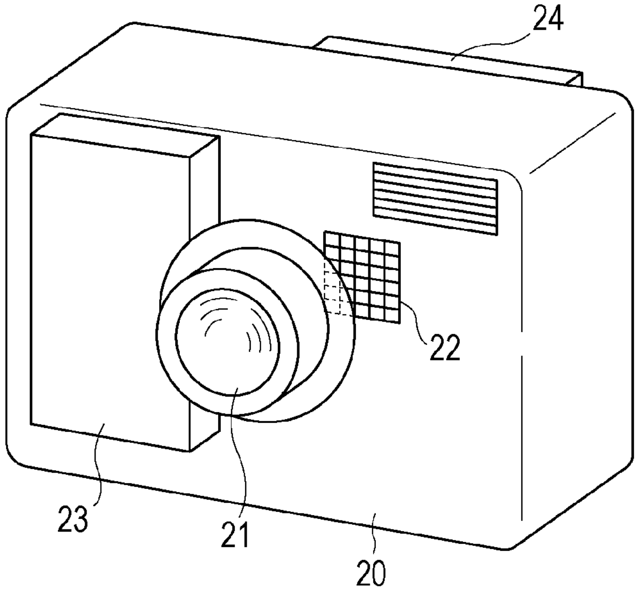
FIG. 11 is a schematic diagram of an image pickup apparatus including a zoom lens. The zoom lens can be implemented according to any one of the first to the seventh embodiments of the present invention.

FIG. 11 is a schematic diagram of a digital still camera (an image pickup apparatus) including any of the zoom lenses according to the first to the fifth embodiments of the present invention. The zoom lenses according to the respective embodiments are each an imaging lens system intended for an image pickup apparatus such as a video camera, a digital still camera, a silver-halide-film camera, or a broadcast camera. The zoom lens according to each of the embodiments may also be used as a projection optical system intended for a projector. In each of the sectional views of the zoom lenses, the left side of the drawing corresponds to the object side (front side), and the right side corresponds to the image side (rear side). Therefore, taking as a reference the object side and image side of the zoom lens, "i" denotes the ordinal position of the lens element from the object side to the image side in each of the sectional views, "Li" denotes the i-th lens unit (or lens group).

In each of the embodiments, an aperture stop SP is provided between the second lens unit L2 and the third lens unit L3. A flare cut-off stop FP is provided on the image side of the third lens unit L3 and cuts off unnecessary light (flare). An optical block GB corresponds to one or more of an optical filter, a face plate, a low-pass filter, an infrared cut-off filter, and the like. The image plane is denoted as IP. If the zoom lens is used as an image pickup optical system of a video camera or a digital still camera, the image plane IP corresponds to the light-receiving surface of a solid-state image pickup device (photoelectric conversion device) such as a charge-coupled-device (CCD) sensor or a complementary-metal-oxide-semiconductor (CMOS) sensor. If the zoom lens is used as an image pickup optical system of a silver-halide-film camera, the image plane IP corresponds to a film surface.

In each of the spherical aberration charts, Fno denotes the f-number, the solid line is for d-line (at a wavelength of 587.6 nm), and the dash-dot-dot line is for g-line (at a wavelength of 435.8 nm). In each of the astigmatism charts, "ΔS" and "ΔM" represent the sagittal image plane and the meridional image plane, respectively, for d-line. Distortion is for d-line. Lateral chromatic aberration is for g-line. In each of the aberration charts, excluding the spherical aberration charts, ω denotes the half angle of view. In each of the embodiments, the wide-angle end and the telephoto end correspond to the extreme ends, respectively, of the zooming range within which a lens unit intended for zooming is movable along the optical axis under specific mechanical conditions.

In each of the embodiments, the lens units move according to loci represented by the arrows illustrated in the sectional view during zooming from the wide-angle end to the telephoto end. The movement of the lens units during zooming causes that the distance between adjacent ones of the lens units changes. Specifically, during zooming from the wide-angle end to the telephoto end, in each of the embodiments, the first lens unit L1 moves along a locus that is convex toward the image side, the second lens unit L2 moves along a locus that is convex toward the image side, the third lens unit L3 moves linearly toward the object side, and the fourth lens unit L4 moves along a locus that is convex toward the object side. Thus, variations in the image plane attributed to zooming are corrected.

In each of the embodiments of the present invention, the moving amount of the first lens unit L1 during zooming is reduced by appropriately setting the refractive power of each of the lens units. Thus, a high-magnification zoom lens with a reduced total length at the telephoto end is provided.

Furthermore, focusing is performed by moving the fourth lens unit L4 along the optical axis. When focusing from an object at infinity to a near object is performed at the telephoto end, the fourth lens unit L4 is moved as represented by an arrow 4*c* illustrated in the sectional view. A solid-line arrow 4*a* and a broken-line arrow 4*b* illustrated in the sectional view represent the loci for correcting variations in the image plane that may occur during zooming from the wide-angle end to the telephoto end when the focus is on an object at infinity and at a near object, respectively. By moving the fourth lens unit L4 along the locus that is convex toward the object side, the distance between the third lens unit L3 and the fourth lens unit L4 is effectively utilized, and the total length of the zoom lens is reduced.

In each of the embodiments, all of or some of lens elements included in the third lens unit L3 are moved in a direction containing a component that is perpendicular to the optical axis. Thus, image blurs are corrected.

Configurations of the respective lens units will now be described. The first lens unit L1 consists of two lens elements, i.e., a negative lens element 110 and a positive lens element 112. The negative lens element 110 and the positive lens element 112 are cemented to each other. When the refractive power of the first lens unit L1 is increased, spherical aberration and longitudinal chromatic aberration often occur at the telephoto end. Such aberrations are corrected by making the positive lens element 112 included in the first lens unit L1 from a low-dispersion material and shaping the positive lens element into an aspherical shape.

The second lens unit L2 includes three lens elements, i.e., a negative lens element 120 having a concave surface on the image side thereof, a negative lens element 122 having a concave surface on the image side thereof, and a positive lens element 124 having a convex surface on the object side thereof. To provide a zoom lens having a wide angle of view with a reduced effective diameter of the first lens unit L1 at the wide-angle end, the second lens unit L2 has an increased refractive power. When the refractive power of the second lens unit L2 is increased, field curvature and lateral chromatic aberration often occur at the wide-angle end. The negative refractive power of the second lens unit L2 is produced by the combination of the two negative lens elements 120 and 122; and one of the surfaces of the lens element 120 that is at the extreme end of the second lens unit L2 on the object side has an aspherical shape. Thus, field curvature is appropriately corrected. Furthermore, the positive lens element 124 included in the second lens unit L2 is made from a high-dispersion material. Thus, longitudinal chromatic aberration is corrected without increasing the refractive power of the positive lens element 124.

The third lens unit L3 includes three lens elements, i.e., a positive lens element 130 having a convex surface on the object side thereof, and a cemented lens in which a positive lens element 132 having a convex surface on the object side thereof and a negative lens element 134 having a concave surface on the image side thereof are cemented to each other. To reduce the total length of the zoom lens at the wide-angle end, the third lens unit L3 has an increased refractive power. When the refractive power of the third lens unit L3 is increased, spherical aberration, longitudinal chromatic aberration, and coma aberration often occur at the wide-angle end. Spherical aberration and comma aberration are corrected by providing the two positive lens elements 130-132 and the one negative lens element 134 in the third lens unit L3. Furthermore, the object-side surface of the positive lens element 130 that is at the extreme end of the third lens unit L3 on the object side has an aspherical shape. Thus, spherical aberration at the wide-angle end of zooming is appropriately corrected. Furthermore, the negative lens element 134 included in the third lens unit L3 is made from a high-index material. Thus, the occurrence of comma aberration and field curvature is suppressed without increasing the refractive power of the negative lens element.

The fourth lens unit L4 consists of one lens element 140 having a positive refractive power. Since the fourth lens unit L4 consists of a single lens element, the total length of the zoom lens in a collapsed state is reduced.

In each of the embodiments, the following conditional expressions are satisfied:

$$4.85<(M1/f1)\times Z<8.00 \quad (1)$$

$$0.15<M2/f2<0.50 \quad (2)$$

where M1 and M2 denote the lengths of travel (length of movement) of the first lens unit L1 and the second lens unit L2, respectively, during zooming from the wide-angle end to the telephoto end, f1 denotes the focal length of the first lens unit L1, f2 denotes the focal length of the second lens unit L2, and Z denotes the zoom ratio of the zoom lens.

Herein, the moving amount is the difference in the position of the lens unit on the optical axis between that at the wide-angle end and that at the telephoto end. The sign of the value representing the moving amount is positive when the lens unit is positioned nearer to the object side at the telephoto end than at the wide-angle end, whereas the sign is negative when the lens unit is positioned nearer to the image side at the telephoto end than at the wide-angle end.

Conditional Expression (1) defines the relationship among the moving amount M1 of the first lens unit L1, the focal length f1 of the first lens unit L1, and the zoom ratio Z. Therefore, Conditional Expression (1) is set to be greater (higher) than its lower limit 4.85 and less (lower) than its upper limit 8.0. If Conditional Expression (1) extends below the lower limit thereof, the focal length f1 of the first lens unit L1 is increased while the refractive power of the first lens unit L1 is reduced. To increase the zoom ratio in such a case, the moving amount of the second lens unit L2 needs to be increased, which leads to an increase in the total length of the zoom lens.

If the upper limit of Conditional Expression (1) is exceeded, the focal length f1 of the first lens unit L1 is reduced while the refractive power of the first lens unit L1 is increased. Consequently, it becomes difficult to correct spherical aberration and longitudinal chromatic aberration at the telephoto end, and it also becomes difficult to reduce variations in coma aberration during zooming.

Conditional Expression (2) defines the relationship between the moving amount M2 of the second lens unit L2 and the focal length f2 of the second lens unit L2. Therefore, Conditional Expression (2) is set to be greater (higher) than its lower limit 0.15 and less (lower) than its upper limit 0.50. If Conditional Expression (2) extends below the lower limit thereof and the focal length f2 of the second lens unit L2 is increased, the refractive power of the second lens unit L2 is reduced. To increase the zoom ratio in such a case, the moving amount of the first lens unit L1 needs to be increased. Increasing the moving amount of the first lens unit L1 leads to an increase in the total length of the zoom lens.

If the upper limit of Conditional Expression (2) is exceeded and the focal length f2 of the second lens unit L2 is reduced, the refractive power of the second lens unit L2 is increased. Consequently, it becomes difficult to correct field curvature at the wide-angle end, and it also becomes difficult to reduce variations in lateral chromatic aberration during zooming.

In each of the embodiments, associated parameters are set appropriately as described above so that Conditional Expressions (1) and (2) are satisfied. Hence, a small-sized, high-magnification zoom lens is provided.

Preferably, in each of the embodiments, the numerical ranges of Conditional Expressions (1) and (2) may be set as follows:

$$4.90<(M1/f1)\times Z<7.80 \quad (1a)$$

$$0.16<M2/f2<0.45 \quad (2a)$$

More preferably, the numerical ranges of Conditional Expressions (1) and (2) may be set as follows:

$$5.00<(M1/f1)\times Z<7.60 \quad (1b)$$

$$0.16<M2/f2<0.40 \quad (2b)$$

Furthermore, in each of the embodiments, one or more of the following conditional expressions may preferably be satisfied. In the conditional expressions, the focal length of the positive lens element included in the first lens unit L1 is denoted as f1p, the Abbe number and the partial dispersion ratio of the material forming the positive lens element included in the first lens unit L1 is denoted as νd1p and θgF1p, respectively, the moving amount of the third lens unit L3 during zooming from the wide-angle end to the telephoto end is denoted as M3, the focal length of the third lens unit L3 is denoted as f3, and the radii of curvature of surfaces of the positive lens element forming the fourth lens unit L4 that are on the object side and on the image side are denoted as r41 and r42, respectively. The one or more conditional expressions that may be satisfied are as follows:

$$36.0<(f1p/f1)\times \nu d1p<50.0 \quad (3)$$

$$4.2<|f1/f2|<6.0 \quad (4)$$

$$1.25<M3/f3<1.70 \quad (5)$$

$$0.80<M1/M3<1.20 \quad (6)$$

$$0.595<\theta gF1p+0.001\times\nu d1p<0.635 \quad (7)$$

$$\text{where } 60.0<\nu d1p<75.0 \quad (8)$$

$$-1.0<(r41-r42)/(r41+r42)<-0.55 \quad (9)$$

Conditional Expression (3) defines the relationship between the ratio of the focal length f1p of the positive lens element included in the first lens unit L1 to the focal length f1 of the first lens unit L1 and the Abbe number νd1p of the material forming the positive lens element included in the first lens unit L1. Therefore, Conditional Expression (3) is set to be greater (higher) than its lower limit 36 and less (lower) than its upper limit 50. If Conditional Expression (3) extends below the lower limit thereof and the focal length f1 of the first lens unit L1 is increased, the refractive power of the first lens unit L1 is reduced, making it difficult to reduce distortion at the wide-angle end and variations in coma aberration during zooming. Moreover, if Conditional Expression (3) extends below the lower limit and the Abbe number νd1p of the material forming the positive lens element included in the first lens unit L1 is reduced, it becomes difficult to correct longitudinal chromatic aberration.

If the upper limit of Conditional Expression (3) is exceeded and the focal length f1 of the first lens unit L1 is reduced, the refractive power of the first lens unit L1 is increased, making it difficult to correct spherical aberration at the telephoto end.

Conditional Expression (4) defines the relationship between the focal length f1 of the first lens unit L1 and the focal length f2 of the second lens unit L2. Therefore, Conditional Expression (4) is set to be greater (higher) than its lower limit 4.2 and less (lower) than its upper limit 6.0. If Conditional Expression (4) extends below its lower limit and the focal length f1 of the first lens unit L1 is reduced, the refractive power of the first lens unit L1 is increased, making it difficult to correct spherical aberration and longitudinal chromatic aberration at the telephoto end. If the upper limit of Conditional Expression (4) is exceeded (if conditional expression is higher than its upper limit) and the focal length f2 of the second lens unit L2 is reduced, the refractive power of the second lens unit L2 is increased, making it difficult to reduce variations in field curvature during zooming.

Conditional Expression (5) defines the relationship between the moving amount M3 of the third lens unit L3 and the focal length f3 of the third lens unit L3. Therefore, Conditional Expression (5) is set to be greater (higher) than its lower limit 1.25 and less (lower) than its upper limit 1.70. If Conditional Expression (5) extends below its lower limit thereof and the focal length f3 of the third lens unit L3 is increased, the refractive power of the third lens unit L3 is reduced. To realize a high magnification in such a case, the lengths of travel of the respective lens units need to be increased. Consequently, the total length of the zoom lens increase. If the upper limit of Conditional Expression (5) is exceeded and the focal length f3 of the third lens unit L3 is reduced, the refractive power of the third lens unit L3 is increased, making it difficult to reduce variations in the image plane during zooming. Furthermore, variations in the f-number during zooming increase. Consequently, the f-number at the telephoto end increases.

Conditional Expression (6) defines the relationship between the moving amount M1 of the first lens unit L1 and the moving amount M3 of the third lens unit L3. Therefore, Conditional Expression (6) is set to be greater (higher) than its lower limit 080 and less (lower) than its upper limit 1.20. If Conditional Expression (6) is lower than its lower limit thereof and the moving amount M3 of the third lens unit L3 is increased, the distance between the second lens unit L2 and the third lens unit L3 needs to be increased. Consequently, the total length of the zoom lens increases. Furthermore, variations in the f-number during zooming increase. If the upper limit of Conditional Expression (6) is exceeded and the moving amount M1 of the first lens unit L1 is increased, the length of advancement of the first lens unit L1 toward the object side is increased. Consequently, the total length of the zoom lens at the telephoto end increases.

Conditional Expression (7) relates to the material forming the positive lens element included in the first lens unit L1. Therefore, Conditional Expression (7) is set to be greater (higher) than its lower limit 0.595 and less (lower) than its upper limit 0.635. If Conditional Expression (7) is lower than its lower limit thereof, the anomalous dispersion characteristic of the material forming the positive lens element included in the first lens unit L1 is reduced, making it difficult to reduce the secondary spectrum at the telephoto end. If the upper limit of Conditional Expression (7) is exceeded, it becomes difficult to reduce variations in longitudinal chromatic aberration during zooming. Note that, in Conditional Expression (7), the Abbe number νd1p of the material forming the positive lens element included in the first lens unit L1 falls within the numerical range defined by Conditional Expression (8).

Conditional Expression (9) defines the shape of the positive lens element forming the fourth lens unit L4. Therefore, Conditional Expression (9) is set to be greater (higher) than its lower limit −1.0 and less (lower) than its upper limit −0.55. If Conditional Expression (9) extends beyond its lower limit thereof, the shape of the positive lens element forming the fourth lens unit L4 becomes a plano-convex shape. Consequently, variations in field curvature at the telephoto end during focusing from an object at infinity to a near object increase. If the upper limit of Conditional Expression (9) is exceeded, the shape of the positive lens element forming the fourth lens unit L4 becomes rather a meniscus shape that is convex toward the object side. Consequently, variations in field curvature at the wide-angle end during focusing from an object at infinity to a near object increase.

Preferably, the numerical ranges of Conditional Expressions (3) to (7) and (9) may be set as follows. In that case, the advantageous effects produced on the basis of Conditional Expressions (3) to (7) and (9) are maximized.

$$37.0<(f1p/f1)\times\nu d1p<49.0 \quad (3a)$$

$$4.3<|f1/f2|<5.8 \quad (4a)$$

$$1.30<M3/f3<1.65 \quad (5a)$$

$$0.85<M1/M3<1.15 \quad (6a)$$

$$0.595<\theta gF1p+0.001\times\nu d1p<0.630 \quad (7a)$$

$$-0.95<(r41-r42)/(r41+r42)<-0.60 \quad (9a)$$

More preferably, the numerical ranges of Conditional Expressions (3) to (7) and (9) may be set as follows:

$$38.0<(f1p/f1)\times\nu d1p<48.0 \quad (3b)$$

$$4.5<|f1/f2|<5.5 \quad (4b)$$

$$1.35<M3/f3<1.60 \quad (5b)$$

$$0.90<M1/M3<1.15 \quad (6b)$$

$$0.595<\theta gF1p+0.001\times\nu d1p<0.620 \quad (7b)$$

$$-0.90<(r41-r42)/(r41+r42)<-0.65 \quad (9b)$$

Numerical Examples 1 to 5 corresponding to the first to fifth embodiments, respectively, of the present invention are given below. In each of Numerical Examples 1 to 5, i denotes the ordinal position of an optical surface from the object side, ri denotes the radius of curvature of the i-th optical surface (the i-th surface), di denotes the distance between the i-th surface and the i+1-th surface, and ndi and νdi denote the refractive index and the Abbe number, respectively, of the material forming the i-th optical member with respect to d-line.

An asterisk ("*") next to the surface number denotes an aspherical surface. Letting the eccentricity be k; the aspherical coefficients be A4, A6, and A8; and the displacement of the surface vertex in the optical-axis direction at a height h from the optical axis be x, the aspherical shape is expressed as follows:

$$x=(h^2/R)/[1+[1-(1+k)(h/R)^2]^{1/2}]+A4h^4+A6h^6+A8h^8$$

where R denotes the paraxial radius of curvature, and "e-Z" denotes "$10^{-z}$". In each of Numerical Examples 1 to 5, two of the surfaces at the extreme end on the image side correspond to the surfaces of the optical block such as a filter or a face plate.

In each of Numerical Examples 1 to 5, the back focal length (BF) corresponds to the length obtained through aerial conversion of the distance from one of the surfaces of the lens system that is at the extreme end on the image side to the paraxial image plane. The total length of the zoom lens is the sum of the distance from the surface that is at the extreme end on the object side to the final lens surface and the back focal length. The correspondence between Numerical Examples 1 to 5 and the conditional expressions given above is summarized in Table 1.

Note that the effective image circle diameter (the diameter of an image circle) at the wide-angle end can be made smaller than that at the telephoto end. This is because barrel-shaped distortion that tends to occur at the wide-angle side can be corrected by enlarging the image when processed.

Numerical Example 1

Unit: mm

Data on surfaces

| Surface No. | r | d | nd | νd |
|---|---|---|---|---|
| 1 | 17.262 | 0.65 | 1.84666 | 23.8 |
| 2 | 13.278 | 3.76 | 1.59201 | 67.0 |
| 3* | −154.322 | (variable) | | |
| 4* | −121.831 | 0.50 | 1.88202 | 37.2 |
| 5* | 5.695 | 2.47 | | |
| 6 | −31.357 | 0.30 | 1.77250 | 49.6 |
| 7 | 19.113 | 0.05 | | |
| 8 | 9.552 | 1.31 | 1.95906 | 17.5 |
| 9 | 29.113 | (variable) | | |
| 10(stop) | ∞ | −0.20 | | |
| 11* | 4.835 | 1.45 | 1.59201 | 67.0 |
| 12* | −13.140 | 0.10 | | |
| 13 | 3.868 | 1.24 | 1.58144 | 40.8 |
| 14 | 53.705 | 0.30 | 2.00100 | 29.1 |
| 15 | 3.101 | 1.34 | | |
| 16 | ∞ | (variable) | | |
| 17 | 10.660 | 1.72 | 1.60311 | 60.6 |
| 18 | 92.498 | (variable) | | |
| 19 | ∞ | 0.80 | 1.51633 | 64.1 |
| 20 | ∞ | 0.99 | | |

Data on aspherical surfaces

3rd surface

K = −2.06794e+002 A4 = 6.57153e−006 A6 = −6.93126e−009
A8 = 2.42994e−011

-continued

Unit: mm

4th surface

K = −3.19343e+003 A4 = −3.86449e−005 A6 = 3.74941e−007
A8 = −2.06972e−009

5th surface

K = −2.98780e−002 A4 = 2.58045e−004 A6 = 1.93724e−006
A8 = 1.60099e−007

11th surface

K = −3.89688e−001 A4 = −4.72376e−004 A6 = −2.12855e−006

12th surface

K = −6.13957e+000 A4 = 7.76455e−005

Other data
Zoom ratio 11.40

| | Wide-angle | Intermediate | Telephoto |
|---|---|---|---|
| Focal length | 4.62 | 24.52 | 52.64 |
| F-number | 3.67 | 5.41 | 7.19 |
| Angle of view | 34.22 | 8.98 | 4.21 |
| Total lens length | 38.46 | 44.54 | 51.71 |
| BF | 4.14 | 9.17 | 4.73 |
| d 3 | 0.34 | 11.69 | 15.20 |
| d 9 | 15.38 | 2.97 | 0.56 |
| d16 | 3.60 | 5.72 | 16.24 |
| d18 | 2.63 | 7.66 | 3.22 |

Data on zoom lens units

| Unit | Starting surface | Focal length |
|---|---|---|
| 1 | 1 | 29.68 |
| 2 | 4 | −6.26 |
| 3 | 10 | 9.45 |
| 4 | 17 | 19.82 |

Numerical Example 2

Unit: mm

Data on surfaces

| Surface No. | r | d | nd | νd |
|---|---|---|---|---|
| 1 | 18.024 | 0.65 | 1.84666 | 23.8 |
| 2 | 13.567 | 3.57 | 1.61881 | 63.9 |
| 3* | −324.889 | (variable) | | |
| 4* | −72.744 | 0.50 | 1.88202 | 37.2 |
| 5* | 6.109 | 2.56 | | |
| 6 | −45.100 | 0.30 | 1.77250 | 49.6 |
| 7 | 14.416 | 0.05 | | |
| 8 | 8.789 | 1.34 | 1.95906 | 17.5 |
| 9 | 23.782 | (variable) | | |
| 10(stop) | ∞ | −0.20 | | |
| 11* | 5.080 | 1.39 | 1.62263 | 58.2 |
| 12* | −14.894 | 0.10 | | |
| 13 | 3.791 | 1.17 | 1.51633 | 64.1 |
| 14 | 12.488 | 0.30 | 2.00100 | 29.1 |
| 15 | 3.118 | 1.34 | | |
| 16 | ∞ | (variable) | | |
| 17 | 10.576 | 1.64 | 1.60311 | 60.6 |
| 18 | 58.426 | (variable) | | |
| 19 | ∞ | 0.80 | 1.51633 | 64.1 |
| 20 | ∞ | 1.04 | | |

| Unit: mm |
|---|
| Data on aspherical surfaces |

3rd surface

K = 2.11834e+002 A4 = 9.82232e−006 A6 = −1.68796e−008
A8 = 7.28713e−011

4th surface

K = −5.22778e+002 A4 = 2.88150e−004 A6 = −5.20263e−006
A8 = 2.78400e−008

5th surface

K = 2.41106e−001 A4 = 5.12556e−004 A6 = 1.23025e−005
A8 = 2.98141e−007

11th surface

K = −8.83597e−002 A4 = −8.56019e−004 A6 = −1.44733e−005

12th surface

K = −6.36725e+000 A4 = 5.12214e−005

Other data
Zoom ratio 11.94

| | Wide-angle | Intermediate | Telephoto |
|---|---|---|---|
| Focal length | 4.41 | 26.20 | 52.65 |
| F-number | 3.67 | 5.50 | 7.19 |
| Angle of view | 5.44 | 8.41 | 4.21 |
| Total lens length | 38.15 | 45.23 | 52.03 |
| BF | 4.16 | 9.33 | 4.66 |
| d 3 | 0.33 | 13.24 | 16.41 |
| d 9 | 15.40 | 2.61 | 0.55 |
| d16 | 3.55 | 5.32 | 15.70 |
| d18 | 2.60 | 7.77 | 3.10 |

Data on zoom lens units

| Unit | Starting surface | Focal length |
|---|---|---|
| 1 | 1 | 31.05 |
| 2 | 4 | −6.21 |
| 3 | 10 | 9.32 |
| 4 | 17 | 21.14 |

Numerical Example 3

Unit: mm

Data on surfaces

| Surface No. | r | d | nd | vd |
|---|---|---|---|---|
| 1 | 15.217 | 0.65 | 1.90366 | 31.3 |
| 2 | 11.388 | 4.61 | 1.55332 | 71.7 |
| 3* | −117.884 | (variable) | | |
| 4* | −27.555 | 0.50 | 1.88202 | 37.2 |
| 5* | 6.229 | 2.28 | | |
| 6 | 367.642 | 0.30 | 1.77250 | 49.6 |
| 7 | 13.070 | 0.05 | | |
| 8 | 8.142 | 1.19 | 2.10205 | 16.8 |
| 9 | 15.215 | (variable) | | |
| 10(stop) | ∞ | −0.20 | | |
| 11* | 4.758 | 1.45 | 1.59201 | 67.0 |
| 12* | −13.876 | 0.10 | | |
| 13 | 4.006 | 1.15 | 1.58144 | 40.8 |
| 14 | 29.994 | 0.30 | 2.00100 | 29.1 |
| 15 | 3.165 | 1.34 | | |
| 16 | ∞ | (variable) | | |
| 17 | 11.483 | 1.69 | 1.60311 | 60.6 |
| 18 | 206.466 | (variable) | | |

Unit: mm

| | | | | |
|---|---|---|---|---|
| 19 | ∞ | 0.80 | 1.51633 | 64.1 |
| 20 | ∞ | 1.04 | | |

Data on aspherical surfaces

3rd surface

K = 2.65834e+001 A4 = 1.71375e−005 A6 = −4.51690e−008
A8 = 1.39286e−010

4th surface

K = −1.24840e+002 A4 = 1.97084e−004 A6 = −3.37910e−006
A8 = 1.45681e−008

5th surface

K = −4.57096e−001 A4 = 1.19908e−003 A6 = 6.67977e−007
A8 = 9.73749e−007

11th surface

K = −1.06976e+000 A4 = 1.39183e−004 A6 = 2.87949e−006

12th surface

K = −4.40633e+000 A4 = 3.44933e−005

Other data
Zoom ratio 13.87

| | Wide-angle | Intermediate | Telephoto |
|---|---|---|---|
| Focal length | 4.62 | 35.34 | 64.00 |
| F-number | 3.62 | 5.58 | 7.19 |
| Angle of view | 34.22 | 6.26 | 3.47 |
| Total lens length | 39.41 | 48.91 | 54.13 |
| BF | 4.97 | 9.80 | 4.56 |
| d 3 | 0.30 | 14.17 | 16.21 |
| d 9 | 15.50 | 2.25 | 0.55 |
| d16 | 3.22 | 7.28 | 17.41 |
| d18 | 3.41 | 8.24 | 3.00 |

Data on zoom lens units

| Unit | Starting surface | Focal length |
|---|---|---|
| 1 | 1 | 29.91 |
| 2 | 4 | −5.95 |
| 3 | 10 | 9.69 |
| 4 | 17 | 20.09 |

Numerical Example 4

Unit: mm

Data on surfaces

| Surface No. | r | d | nd | vd |
|---|---|---|---|---|
| 1 | 17.294 | 0.65 | 1.94595 | 18.0 |
| 2 | 14.192 | 3.56 | 1.58913 | 61.3 |
| 3* | −125.103 | (variable) | | |
| 4* | −57.270 | 0.50 | 1.88202 | 37.2 |
| 5* | 6.068 | 2.44 | | |
| 6 | −33.000 | 0.30 | 1.77250 | 49.6 |
| 7 | 16.427 | 0.05 | | |
| 8 | 9.373 | 1.48 | 1.95906 | 17.5 |
| 9 | 30.494 | (variable) | | |
| 10(stop) | ∞ | −0.20 | | |
| 11* | 4.766 | 1.45 | 1.59201 | 67.0 |
| 12* | −13.580 | 0.10 | | |
| 13 | 3.878 | 1.16 | 1.57501 | 41.5 |
| 14 | 23.811 | 0.30 | 2.00100 | 29.1 |
| 15 | 3.083 | 1.34 | | |
| 16 | ∞ | (variable) | | |

-continued

| Unit: mm | | | | |
|---|---|---|---|---|
| 17 | 10.371 | 1.67 | 1.60311 | 60.6 |
| 18 | 57.626 | (variable) | | |
| 19 | ∞ | 0.80 | 1.51633 | 64.1 |
| 20 | ∞ | 1.04 | | |

Data on aspherical surfaces

3rd surface

K = 2.82250e+001 A4 = 1.60727e−005 A6 = −3.00104e−008
A8 = 1.51936e−010

4th surface

K = −2.41681e+002 A4 = 1.87013e−004 A6 = −4.10910e−006
A8 = 2.21492e−008

5th surface

K = −6.69692e−001 A4 = 8.56979e−004 A6 = 2.11720e−005
A8 = 2.71143e−007

11th surface

K = −7.95081e−001 A4 = −9.34084e−005 A6 = −1.16738e−005

12th surface

K = −1.47464e+001 A4 = −3.54316e−004

Other data
Zoom ratio 11.56

| | Wide-angle | Intermediate | Telephoto |
|---|---|---|---|
| Focal length | 4.56 | 24.81 | 52.65 |
| F-number | 3.60 | 5.34 | 7.19 |
| Angle of view | 34.57 | 8.88 | 4.21 |
| Total lens length | 38.38 | 44.48 | 51.83 |
| BF | 4.21 | 9.21 | 4.77 |
| d 3 | 0.33 | 11.63 | 14.83 |
| d 9 | 15.38 | 2.92 | 0.55 |
| d16 | 3.66 | 5.91 | 16.87 |
| d18 | 2.64 | 7.64 | 3.20 |

Data on zoom lens units

| Unit | Starting surface | Focal length |
|---|---|---|
| 1 | 1 | 29.14 |
| 2 | 4 | −6.18 |
| 3 | 10 | 9.45 |
| 4 | 17 | 20.69 |

Numerical Example 5

Unit: mm

Data on surfaces

| Surface No. | r | d | nd | νd |
|---|---|---|---|---|
| 1 | 15.359 | 0.65 | 2.00100 | 29.1 |
| 2 | 11.937 | 4.40 | 1.55332 | 71.7 |
| 3* | −97.205 | (variable) | | |
| 4* | −25.618 | 0.50 | 1.88202 | 37.2 |
| 5* | 6.529 | 2.24 | | |
| 6 | 203.305 | 0.30 | 1.77250 | 49.6 |
| 7 | 11.956 | 0.05 | | |
| 8 | 7.802 | 1.21 | 2.10205 | 16.8 |
| 9 | 13.953 | (variable) | | |
| 10(stop) | ∞ | −0.20 | | |
| 11* | 4.810 | 1.44 | 1.59201 | 67.0 |
| 12* | −14.050 | 0.10 | | |
| 13 | 3.952 | 1.18 | 1.58144 | 40.8 |
| 14 | 32.181 | 0.30 | 2.00100 | 29.1 |

-continued

| Unit: mm | | | | |
|---|---|---|---|---|
| 15 | 3.155 | 1.34 | | |
| 16 | ∞ | (variable) | | |
| 17 | 11.437 | 1.68 | 1.60311 | 60.6 |
| 18 | 186.295 | (variable) | | |
| 19 | ∞ | 0.80 | 1.51633 | 64.1 |
| 20 | ∞ | 1.01 | | |

Data on aspherical surfaces

3rd surface

K = 1.11058e+001 A4 = 1.82234e−005 A6 = −4.44618e−008
A8 = 1.50183e−010

4th surface

K = −1.16941e+002 A4 = 1.80125e−004 A6 = −1.14550e−006
A8 = −2.24229e−008

5th surface

K = −3.55304e−001 A4 = 1.27172e−003 A6 = −6.65481e−006
A8 = 1.53874e−006

11th surface

K = −1.07727e+000 A4 = 1.49726e−004 A6 = 4.26719e−006

12th surface

K = −1.56394e+000 A4 = 1.48142e−004

Other data
Zoom ratio 14.73

| | Wide-angle | Intermediate | Telephoto |
|---|---|---|---|
| Focal length | 4.62 | 36.43 | 68.00 |
| F-number | 3.59 | 5.54 | 7.19 |
| Angle of view | 34.22 | 6.07 | 3.26 |
| Total lens length | 39.59 | 49.47 | 54.74 |
| BF | 4.89 | 10.04 | 4.53 |
| d 3 | 0.29 | 14.39 | 16.47 |
| d 9 | 15.70 | 2.41 | 0.55 |
| d16 | 3.52 | 7.44 | 17.99 |
| d18 | 3.35 | 8.50 | 2.99 |

Data on zoom lens units

| Unit | Starting surface | Focal length |
|---|---|---|
| 1 | 1 | 29.78 |
| 2 | 4 | −5.87 |
| 3 | 10 | 9.71 |
| 4 | 17 | 20.13 |

TABLE 1

| | Example 1 | Example 2 | Example 3 | Example 4 | Example 5 |
|---|---|---|---|---|---|
| M1/f1 × Z | 5.09 | 5.33 | 6.83 | 5.33 | 7.49 |
| M2/f2 | 0.26 | 0.36 | 0.20 | 0.17 | 0.18 |
| (f1p/f1) × νd1p | 47.03 | 43.45 | 45.56 | 39.96 | 45.75 |
| \|f1/f2\| | 4.74 | 5.00 | 5.03 | 4.71 | 5.08 |
| M3/f3 | 1.40 | 1.36 | 1.42 | 1.46 | 1.45 |
| M1/M3 | 1.00 | 1.10 | 1.07 | 0.98 | 1.07 |
| θgF1p + 0.001 × νd1p | 0.603 | 0.605 | 0.612 | 0.599 | 0.612 |
| νd1p | 67.0 | 63.9 | 71.7 | 61.3 | 71.7 |
| (r41 − r42)/(r41 + r42) | −0.79 | −0.69 | −0.89 | −0.69 | −0.88 |

Referring now to FIG. 11, a digital still camera as another embodiment will be described in which the zoom lens according to any of the first to fifth embodiments serves as an imaging optical system. The digital still camera illustrated in FIG. 11 includes a camera body 20, an imaging optical system 21 corresponding to the zoom lens according to any of the first to fifth embodiments, a solid-state image pickup device (photoelectric conversion device) 22 such as a CCD sensor or a CMOS sensor provided in the camera body 20 and that receives an optical image of an object formed by the imaging optical system 21, a memory 23 that stores information corresponding to the optical image of the object obtained through photoelectric conversion performed by the solid-state image pickup device 22, and a finder 24 that includes a liquid-crystal display panel or the like and through which the image of the object formed on the solid-state image pickup device 22 is observed. If the zoom lens according to any of the first to fifth embodiments of the present invention is applied to an image pickup apparatus such as a digital still camera, an image pickup apparatus that is of a small size and has a high magnification is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-161330, filed Aug. 2, 2013, which is hereby incorporated by reference herein in its entirety.

What is claimed is:

1. A zoom lens comprising, in order from an object side to an image side thereof:

a first lens unit having a positive refractive power;

a second lens unit having a negative refractive power;

a third lens unit having a positive refractive power; and a fourth lens unit having a positive refractive power, wherein a distance between adjacent ones of the lens units changes during zooming, wherein the first lens unit consists of, in order from the object side to the image side thereof, one negative lens element and one positive lens element, wherein the zoom lens satisfies the following conditional expressions:

$$4.85<(M1/f1)\times Z<8.0$$

$$0.15<M2/f2<0.50$$

where M1 denotes a moving amount of the first lens unit during zooming from a wide-angle end to a telephoto end, M2 denotes a moving amount of the second lens unit during zooming from the wide-angle end to the telephoto end, f1 denotes a focal length of the first lens unit, f2 denotes a focal length of the second lens unit, and Z denotes a zoom ratio of the zoom lens, and wherein a sign of a value representing each of the moving amounts is positive in a case where a corresponding one of the lens units is positioned nearer to the object side at the telephoto end than at the wide-angle end, and the sign is negative in a case where the lens unit is positioned nearer to the image side at the telephoto end than at the wide-angle end.

2. The zoom lens according to claim 1, wherein the zoom lens further satisfies the following conditional expression:

$$36.0<(f1p/f1)\times \nu d1p<50.0$$

where f1p denotes a focal length of the positive lens element included in the first lens unit, and νd1p denotes an Abbe number of a material forming the positive lens element.

3. The zoom lens according to claim 1, wherein the zoom lens further satisfies the following conditional expression:

$$4.2<|f1/f2|<6.0.$$

4. The zoom lens according to claim 1, wherein the zoom lens further satisfies the following conditional expression:

$$1.25<M3/f3<1.70$$

where M3 denotes a moving amount of the third lens unit during zooming from the wide-angle end to the telephoto end, and f3 denotes a focal length of the third lens unit.

5. The zoom lens according to claim 1, wherein the zoom lens further satisfies the following conditional expression:

$$0.80<M1/M3<1.20$$

where M3 denotes a moving amount of the third lens unit during zooming from the wide-angle end to the telephoto end.

6. The zoom lens according to claim 1, wherein the zoom lens further satisfies the following conditional expressions:

$$0.595<\theta gF1p+0.001\times \nu d1p<0.635$$

$$60.0<\nu d1p<75.0$$

where νd1p and θgF1p denote an Abbe number and a partial dispersion ratio, respectively, of a material forming the positive lens element included in the first lens unit.

7. The zoom lens according to claim 1, wherein the fourth lens unit consists of one lens element, and wherein the zoom lens further satisfies the following conditional expression:

$$-1.0<(r41-r42)/(r41+r42)<-0.55$$

where r41 and r42 denote radii of curvature of surfaces of the one lens element on the object side and on the image side, respectively.

8. The zoom lens according to claim 1, wherein an effective image circle diameter at the wide-angle end is smaller than an effective image circle diameter at the telephoto end.

9. An image pickup apparatus comprising:

a zoom lens; and an image pickup device that receives an optical image formed by the zoom lens, wherein the zoom lens includes, in order from an object side to an image side thereof:

a first lens unit having a positive refractive power;

a second lens unit having a negative refractive power;

a third lens unit having a positive refractive power; and a fourth lens unit having a positive refractive power, wherein a distance between adjacent ones of the lens units changes during zooming, wherein the first lens unit consists of, in order from the object side to the image side thereof, one negative lens element and one positive lens element, wherein the zoom lens satisfies the following conditional expressions:

$$4.85<(M1/f1)\times Z<8.0$$

$$0.15<M2/f2<0.50$$

where M1 denotes a moving amount of the first lens unit during zooming from a wide-angle end to a telephoto end, M2 denotes a moving amount of the second lens unit during zooming from the wide-angle end to the telephoto end, f1 denotes a focal length of the first lens unit, f2 denotes a focal length of the second lens unit, and Z denotes a zoom ratio of the zoom lens, and wherein a sign of a value representing each of the moving amount is positive in a case where a corresponding one of the lens units is positioned nearer to the object side at the telephoto end than at the wide-angle end, and the sign is negative in a case where the lens unit is positioned nearer to the image side at the telephoto end than at the wide-angle end.

* * * * *